(12) United States Patent
Sugihara

(10) Patent No.: US 12,541,838 B2
(45) Date of Patent: Feb. 3, 2026

(54) INSPECTION APPARATUS AND REFERENCE IMAGE GENERATION METHOD

(71) Applicant: NuFlare Technology, Inc., Yokohama (JP)

(72) Inventor: Shinji Sugihara, Tokyo (JP)

(73) Assignee: NuFlare Technology, Inc., Yokohama (JP)

( * ) Notice: Subject to any disclaimer, the term of this patent is extended or adjusted under 35 U.S.C. 154(b) by 262 days.

(21) Appl. No.: 18/560,833

(22) PCT Filed: Mar. 23, 2022

(86) PCT No.: PCT/JP2022/013598
§ 371 (c)(1),
(2) Date: Nov. 14, 2023

(87) PCT Pub. No.: WO2023/026557
PCT Pub. Date: Mar. 2, 2023

(65) Prior Publication Data
US 2024/0257300 A1 Aug. 1, 2024

(30) Foreign Application Priority Data

Aug. 27, 2021 (JP) ................................. 2021-138841

(51) Int. Cl.
*G06T 7/00* (2017.01)
*G01N 21/956* (2006.01)
(Continued)

(52) U.S. Cl.
CPC ......... *G06T 7/0006* (2013.01); *G01N 21/956* (2013.01); *G06T 3/403* (2013.01);
(Continued)

(58) Field of Classification Search
CPC ..... G06T 7/0004; G06T 7/0006; G06T 7/001; G06T 7/33–344; G06T 2207/30148;
(Continued)

(56) References Cited

U.S. PATENT DOCUMENTS 5,804,340 A 9/1998 Garza et al.
6,844,550 B1 1/2005 Yin et al.
(Continued)

FOREIGN PATENT DOCUMENTS

EP 0 853 243 A2 7/1998
JP 2006-208340 A 8/2006
(Continued)

OTHER PUBLICATIONS

Japanese Decision to Grant issued Oct. 1, 2024 in Japanese Patent Application No. 2021-138841 (with unedited computer-generated English Translation), 5 pages.
(Continued)

*Primary Examiner* — Geoffrey E Summers
(74) *Attorney, Agent, or Firm* — Oblon, McClelland, Maier & Neustadt, L.L.P.

(57) ABSTRACT

According to embodiments, an inspection apparatus includes an imaging mechanism, an image acquisition circuit that extracts an outline from image data of a sample, a development circuit that generates a developed image, an outline data generation circuit that generates data of an outline point of a pattern of the developed image, an area calculation circuit that calculates an area of a region not included in the pattern in a circle centered on the outline point, an estimation circuit that calculates a resizing amount of the outline point based on the area, and a reference image generation circuit that executes a resizing process of data of the outline point based on the resizing amount and generates
(Continued)

a reference image based on the data of the outline point subjected to the resizing process.

16 Claims, 17 Drawing Sheets

(51) Int. Cl.
G06T 3/403 (2024.01)
G06T 7/13 (2017.01)
G06T 7/33 (2017.01)
H01L 21/66 (2006.01)

(52) U.S. Cl.
CPC ............... G06T 7/001 (2013.01); G06T 7/13 (2017.01); G06T 7/344 (2017.01); H01L 22/12 (2013.01); G06T 2207/10061 (2013.01); G06T 2207/30148 (2013.01)

(58) Field of Classification Search
CPC ......... G06T 2207/10061; G06T 3/4007; G06T 3/403; G06T 7/13; H01L 22/12; G01N 21/956; G01N 21/8851; G01N 21/9501; G01N 2021/8664; G01N 2021/8887
See application file for complete search history.

(56) References Cited

U.S. PATENT DOCUMENTS

| | | | |
|---|---|---|---|
| 2005/0200841 | A1 | 9/2005 | Talbot et al. |
| 2009/0238441 | A1* | 9/2009 | Yamashita .............. G06T 7/001 |
| | | | 382/144 |
| 2015/0212019 | A1* | 7/2015 | Shishido ............ G01N 23/2251 |
| | | | 250/307 |
| 2016/0169819 | A1* | 6/2016 | Usui ..................... H01J 37/222 |
| | | | 250/306 |
| 2020/0209761 | A1 | 7/2020 | Liebregts et al. |
| 2022/0028052 | A1 | 1/2022 | Li et al. |
| 2023/0186459 | A1* | 6/2023 | Nakazawa .............. G06T 7/337 |
| | | | 382/145 |

FOREIGN PATENT DOCUMENTS

| | | |
|---|---|---|
| JP | 2009-71271 A | 4/2009 |
| JP | 2013-246062 A | 12/2013 |
| JP | 2022-120623 A | 8/2022 |
| JP | 2022-124187 A | 8/2022 |
| JP | 2023-30539 A | 3/2023 |
| TW | 202032111 A | 9/2020 |
| TW | 202043911 A | 12/2020 |

OTHER PUBLICATIONS

International Search Report mailed on May 31, 2022 in PCT/JP2022/013598 filed on Mar. 23, 2022 (2 pages).
Korean Decision to Grant issued Jun. 17, 2025 in Korean Patent Application No. 10-2023-7037610 (with unedited computer-generated English Translation), 4 pages.

* cited by examiner

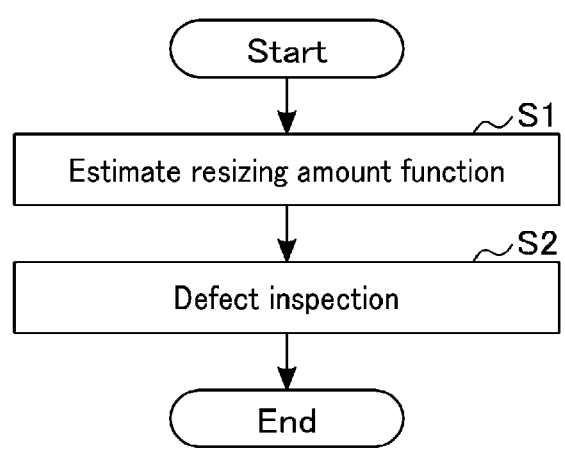
F I G. 2

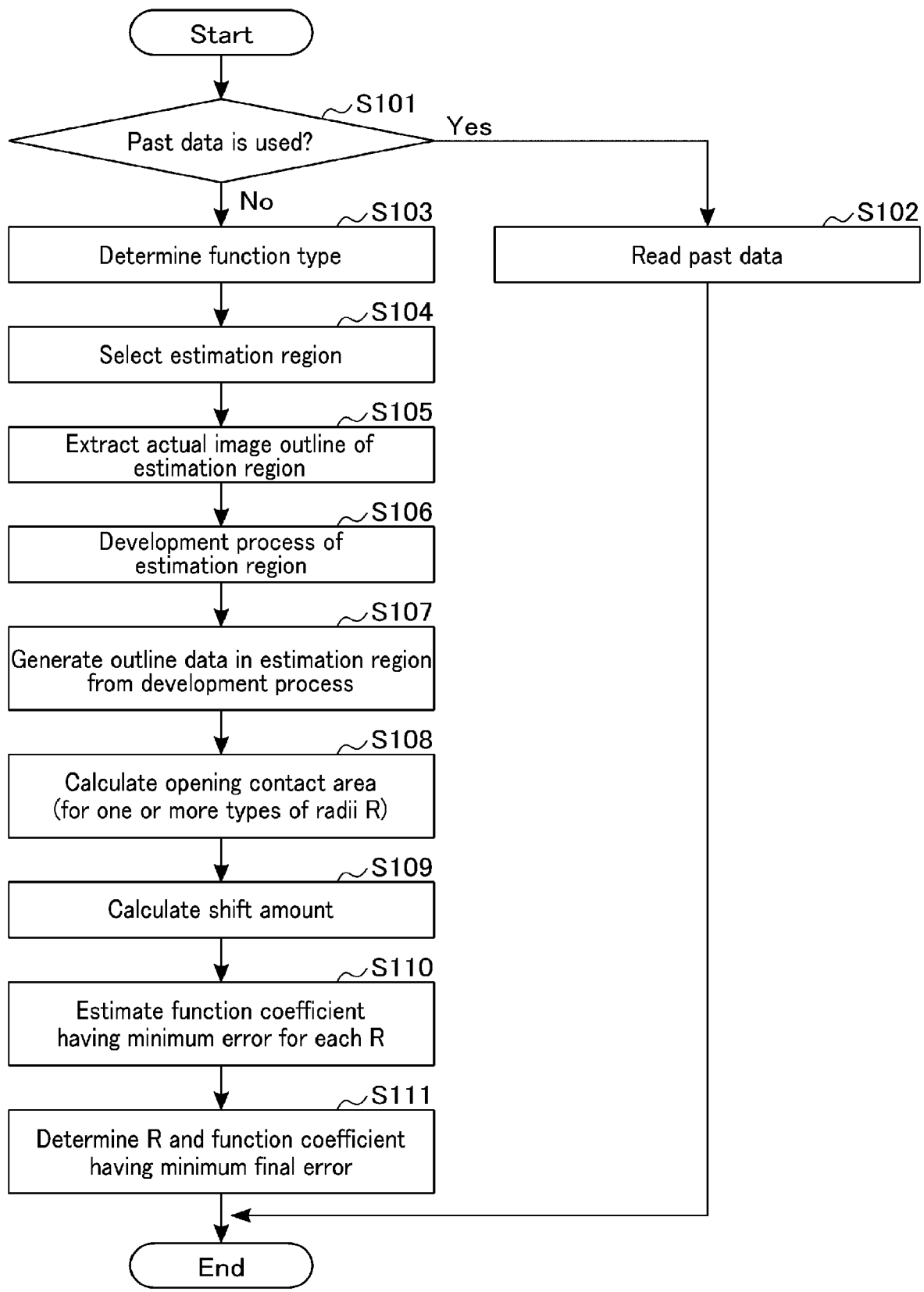
F I G. 3

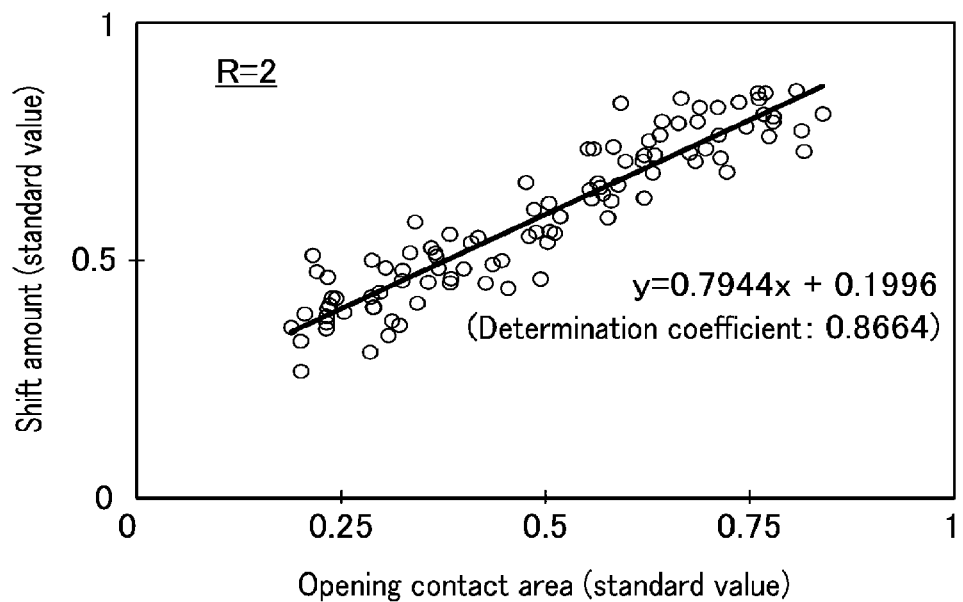
F I G. 7
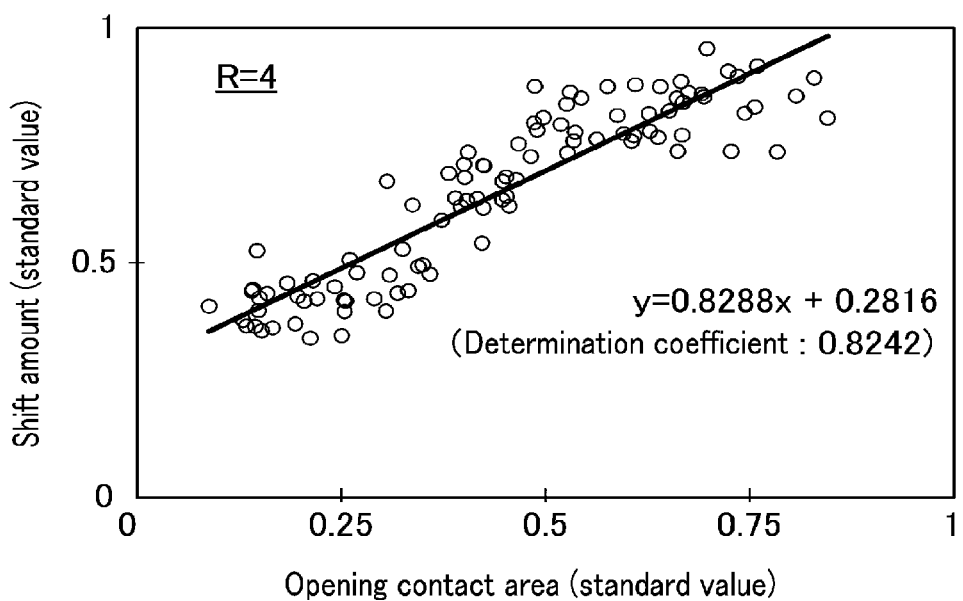
F I G. 8

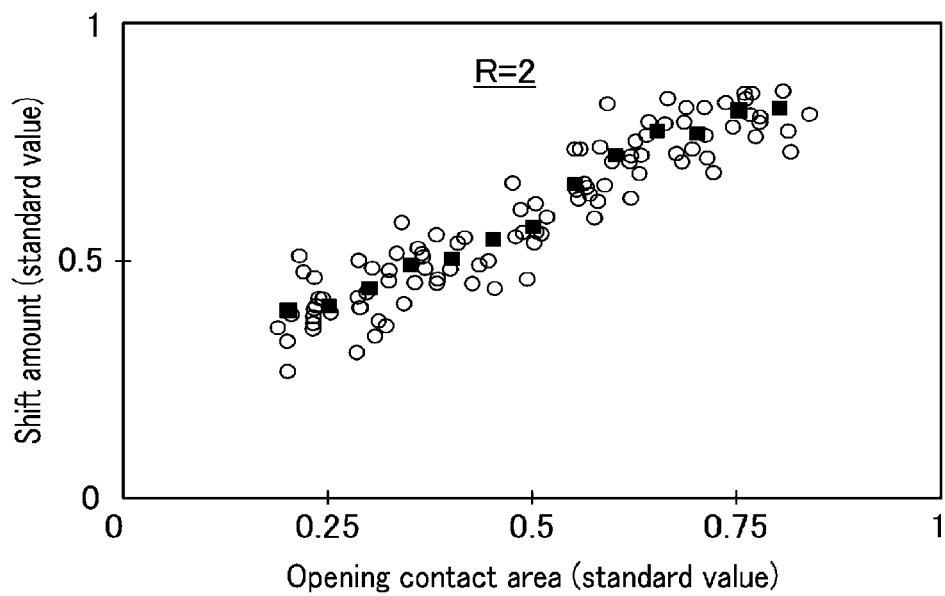
F I G. 9
| Opening contact area (standard value) | Shift amount (standard value) |
|---|---|
| 0.05 | 0 |
| 0.10 | 0 |
| 0.15 | 0 |
| 0.20 | 0.399 |
| 0.25 | 0.408 |
| 0.30 | 0.455 |
| 0.35 | 0.493 |
| 0.40 | 0.506 |
| 0.45 | 0.547 |
| 0.50 | 0.573 |
| 0.55 | 0.661 |
| 0.60 | 0.722 |
| 0.65 | 0.773 |
| 0.70 | 0.767 |
| 0.75 | 0.815 |
| 0.80 | 0.820 |
| 0.85 | 0 |
| 0.90 | 0 |
| 0.95 | 0 |
| 1 | 0 |
F I G. 10

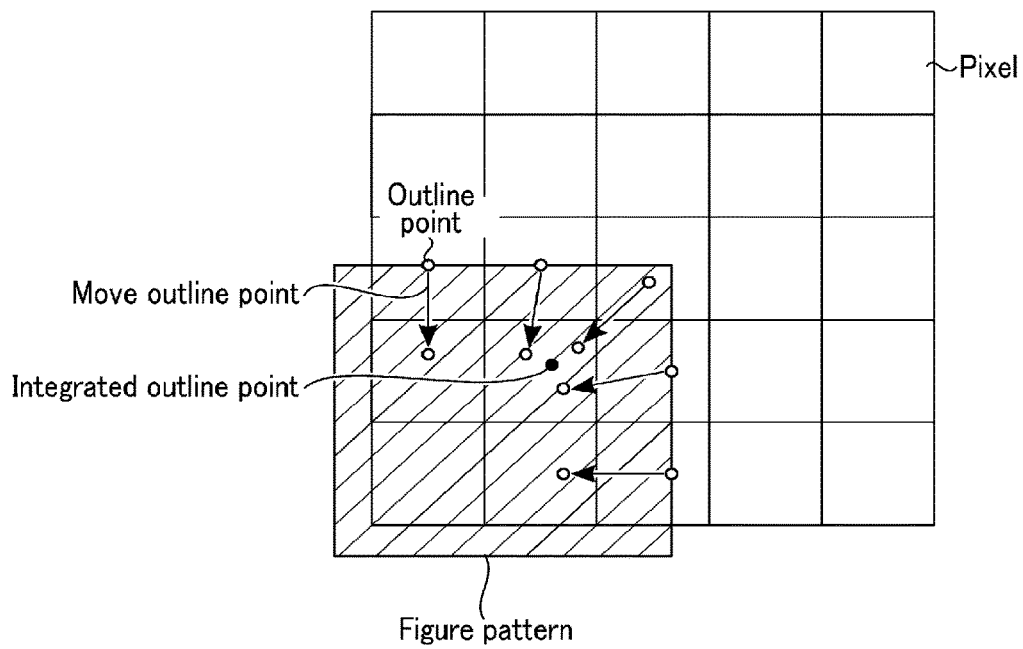
F I G. 13
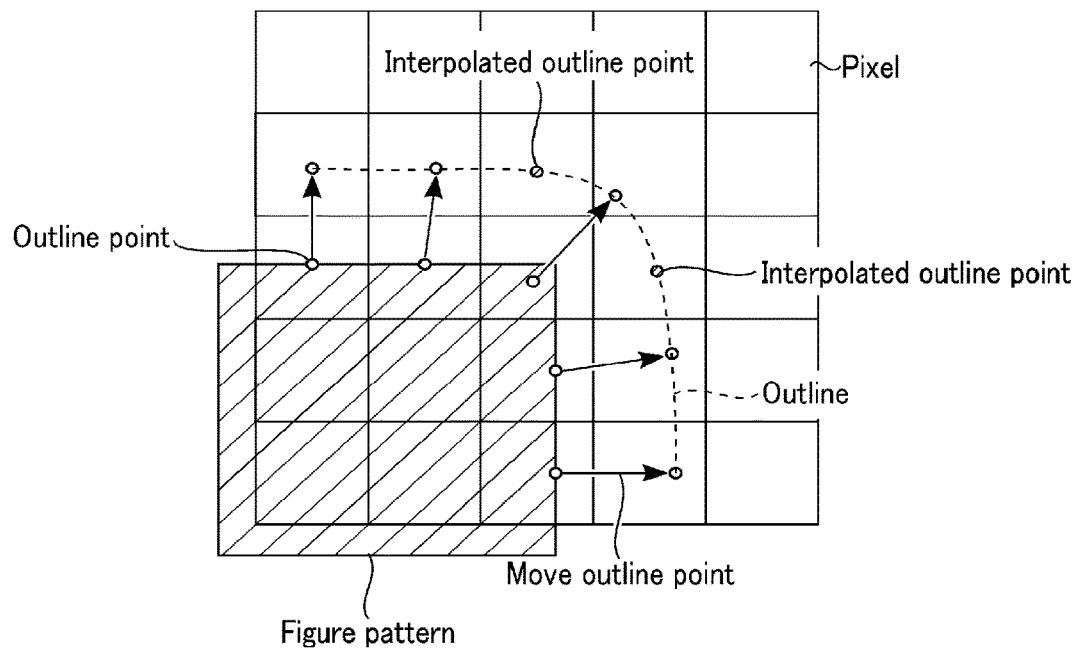
F I G. 14

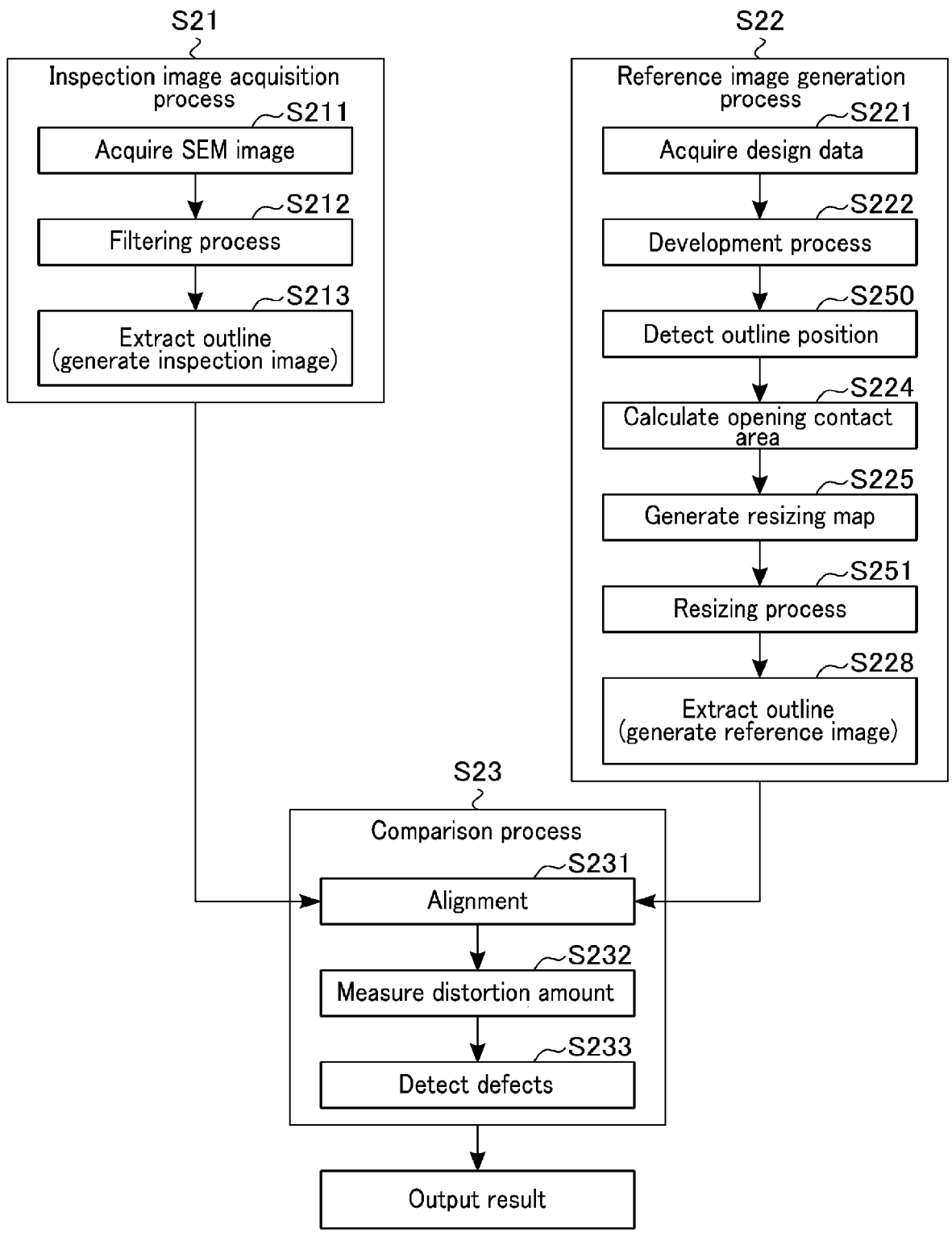
F I G. 19

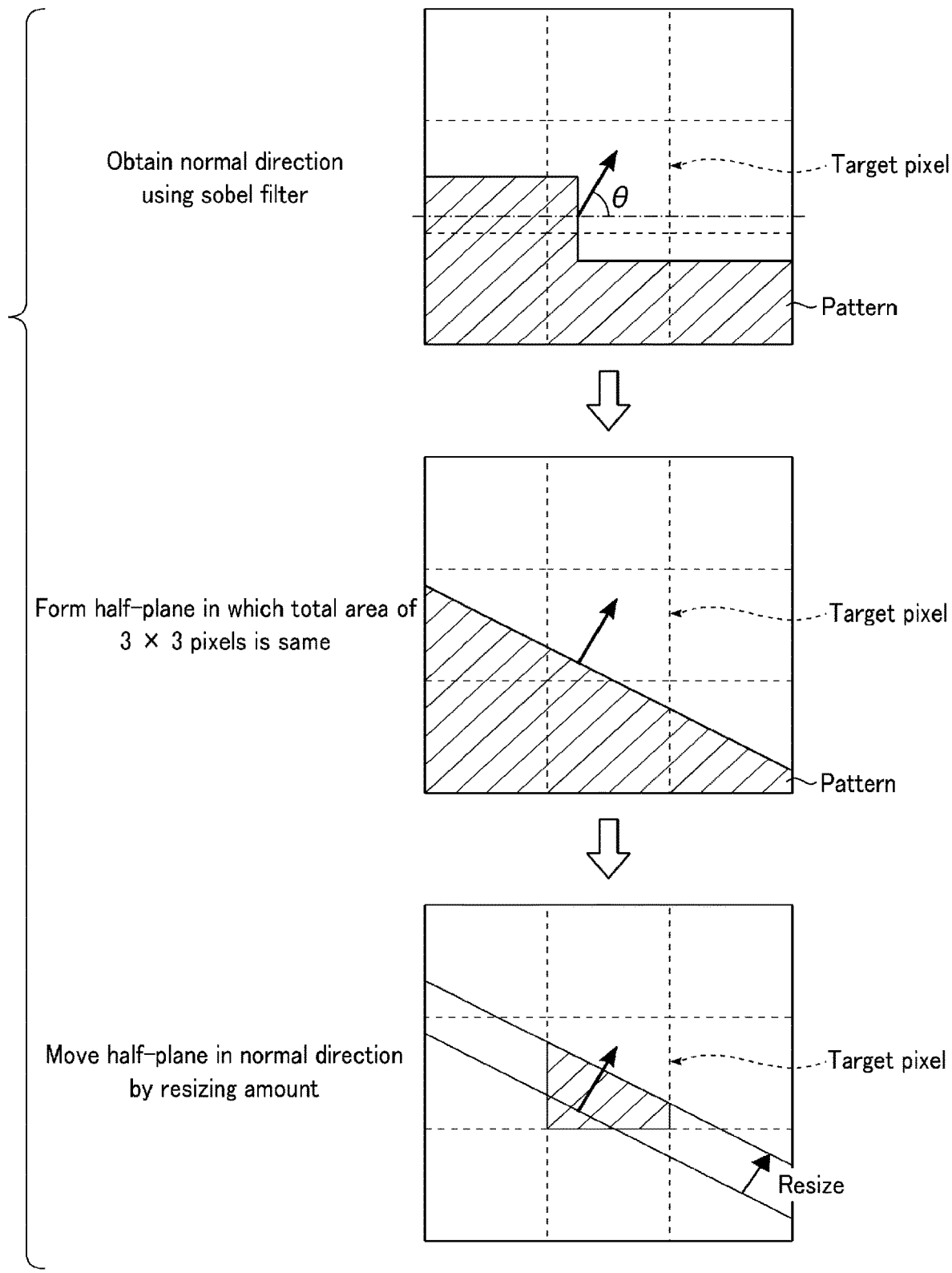
F I G. 20

INSPECTION APPARATUS AND REFERENCE IMAGE GENERATION METHOD

CROSS-REFERENCE TO RELATED APPLICATIONS

This is a U.S. national phase application under 35 USC 371 of International Application PCT/JP2022/013598 (not published in English), filed Mar. 23, 2022.

FIELD

The present invention relates generally to an inspection apparatus for inspecting a defect of a pattern formed on a sample and a reference image generation method.

BACKGROUND

The process of manufacturing a semiconductor device includes a step where an exposure apparatus (also referred to as a "stepper" or a "scanner") performs reduced exposure to transfer circuit patterns onto a semiconductor substrate. The exposure apparatus uses a mask (also referred to as a "reticle") with an original pattern (also referred to as a "mask pattern") for the transfer of a circuit pattern onto a semiconductor substrate (also referred to as a "wafer").

For example, state-of-the-art devices require formation of circuit patterns with line widths of a few nanometers. As the circuit patterns are miniaturized, original patterns in the mask are also miniaturized. Further, as the circuit patterns are miniaturized, super-resolution techniques such as optical proximity correction (OPC) or sub resolution assist feature (SRAF) have been introduced, and original patterns have become complicated. Therefore, a mask inspection apparatus is required to have a high defect detection capability corresponding to miniaturized and complicated original patterns.

There are modes of defect inspection including a die-to-database (D-DB) mode in which an inspection image based on an image capturing a mask is compared with a reference image based on design data, and a die-to-die (D-D) mode in which images in a plurality of regions having the same pattern formed on a mask are compared to one another.

The dimensions of a pattern formed on a mask may shift with respect to the design data due to a pattern forming (drawing) process. In the case of the D-DB mode, if the dimension shift occurs, the edge position of the pattern of the inspection image may not align with the edge position of the reference image. If a misalignment occurs between the reference image and the inspection image, the misaligned portion may be detected as a pseudo defect.

In order to cope with the dimension shift, when a reference image is created, corrections such as a resizing process of moving an edge position of the pattern and a corner rounding process of rounding a corner portion of the pattern are performed on a two valued or multi-valued developed image generated based on the design data.

For example, Cited Document 1 discloses a technique of obtaining a resizing amount in a resizing process from a distance of an adjacent graphic existing in the vicinity of each pixel in a developed image.

CITATION LIST

Patent Literature

Patent Literature 1: Jpn. Pat. Appln. KOKAI Publication No. 2006-208340

SUMMARY

Technical Problem

The dimension shift of the pattern in the inspection image depends on the size and shape of the pattern. In order to cope with the dimension shift, classification of patterns is performed when a reference image is created, and correction such as resizing process may be performed based on a resizing amount set for each class. However, as patterns become more complicated, classification of patterns into classes becomes difficult, and uniform parameter setting for each class also becomes difficult. Therefore, it is difficult to improve the degree of coincidence between the inspection image and the reference image.

The present invention has been made in view of these points. That is, according to the present invention, the inspection apparatus can calculate the area of the isotropic distance of the opening portion for each outline point of the pattern. Then, in the inspection apparatus, the resizing amount based on the area can be calculated, and the resizing process can be executed. Accordingly, an object of the present invention is to provide an inspection apparatus and a reference image generation method capable of reducing detection of a pseudo defect caused by a misalignment.

Solution to Problem

According to a first aspect of the present invention, an inspection apparatus includes an imaging mechanism for imaging a sample; an image acquisition circuit configured to extract an outline from image data of the sample imaged by the imaging mechanism; a development circuit configured to generate a developed image from design data; an outline data generation circuit configured to generate data of an outline point of a pattern of the developed image; an area calculation circuit configured to calculate an area of a region not included in the pattern in a circle centered on the outline point; an estimation circuit configured to calculate a resizing amount of the outline point based on the area; and a reference image generation circuit configured to execute a resizing process of data of the outline point based on the resizing amount and generate a reference image based on the data of the outline point subjected to the resizing process.

According to a second aspect of the present invention, an inspection apparatus includes an imaging mechanism for imaging a sample; an image acquisition circuit configured to extract an outline from image data of the sample imaged by the imaging mechanism; an outline data generation circuit configured to generate data of an outline point of a pattern of design data; an area calculation circuit configured to calculate an area of a region not included in the pattern in a circle centered on the outline point; an estimation circuit configured to calculate a resizing amount of the outline point based on the area; a development circuit configured to generate a developed image from design data subjected to resizing process; and a reference image generation circuit configured to execute the resizing process of the design data based on the resizing amount and generate a reference image based on the developed image subjected to the resizing process.

According to a third aspect of the present invention, a reference image generation method includes extracting an outline from image data obtained by imaging a sample; generating a developed image from design data; generating data of an outline point of a pattern of the developed image; calculating an area of a region not included in the pattern in a circle centered on the outline point; estimating a function based on the area; calculating a resizing amount of the outline point using the function; executing a resizing process of data of the outline point based on the resizing amount; and generating a reference image based on the data of the outline point subjected to the resizing process.

According to a fourth aspect of the present invention, a reference image generation method includes extracting an outline from image data obtained by imaging a sample; generating data of an outline point of a pattern from design data; calculating an area of a region not included in the pattern in a circle centered on the outline point; estimating a function based on the area; calculating a resizing amount of the outline point using the function; executing a resizing process of the design data based on the resizing amount; generating a developed image from the design data subjected to the resizing process; and generating a reference image based on the developed image.

Advantageous Effects of Invention

According to the inspection apparatus and the reference image generation method of the present invention, when the inspection image and the reference image are compared, the area of the isotropic distance of the opening portion is calculated for each outline point, and the resizing amount based on the area is calculated, whereby the detection of the pseudo defect caused by the misalignment can be reduced.

BRIEF DESCRIPTION OF THE DRAWINGS

FIG. 2 is a flowchart showing an overall flow of an inspection process in the inspection apparatus according to the first embodiment.

FIG. 3 is a flowchart of estimation process of a resizing amount function in the inspection apparatus according to the first embodiment.

FIG. 7 is a graph showing an example in which a regression curve of a linear function is calculated from a relationship between a standard value of the shift amount and an opening contact area having a radius R=2 in the inspection apparatus according to the first embodiment.

FIG. 8 is a graph showing an example in which a regression curve of a linear function is calculated from a relationship between a standard value of the shift amount and an opening contact area having a radius R=4 in the inspection apparatus according to the first embodiment.

FIG. 9 is a graph showing an example in which an average value for each arbitrary section of the opening contact area is calculated from a relationship between a standard value of the shift amount and an opening contact area having a radius R=2 in the inspection apparatus according to the first embodiment.

FIG. 10 is a table based on the average value described in FIG. 9.

FIG. 13 is a diagram showing an example of a case where a figure pattern is reduced by a resizing process in the inspection apparatus according to the first embodiment.

FIG. 14 is a diagram showing an example of a case where a figure pattern is expanded by a resizing process in the inspection apparatus according to the first embodiment.

FIG. 19 is a flowchart of a defect inspection process in the inspection apparatus according to the third embodiment.

FIG. 20 is a diagram showing an example of resizing process of a developed image in the inspection apparatus according to the third embodiment.

DETAILED DESCRIPTION

Figure 1:
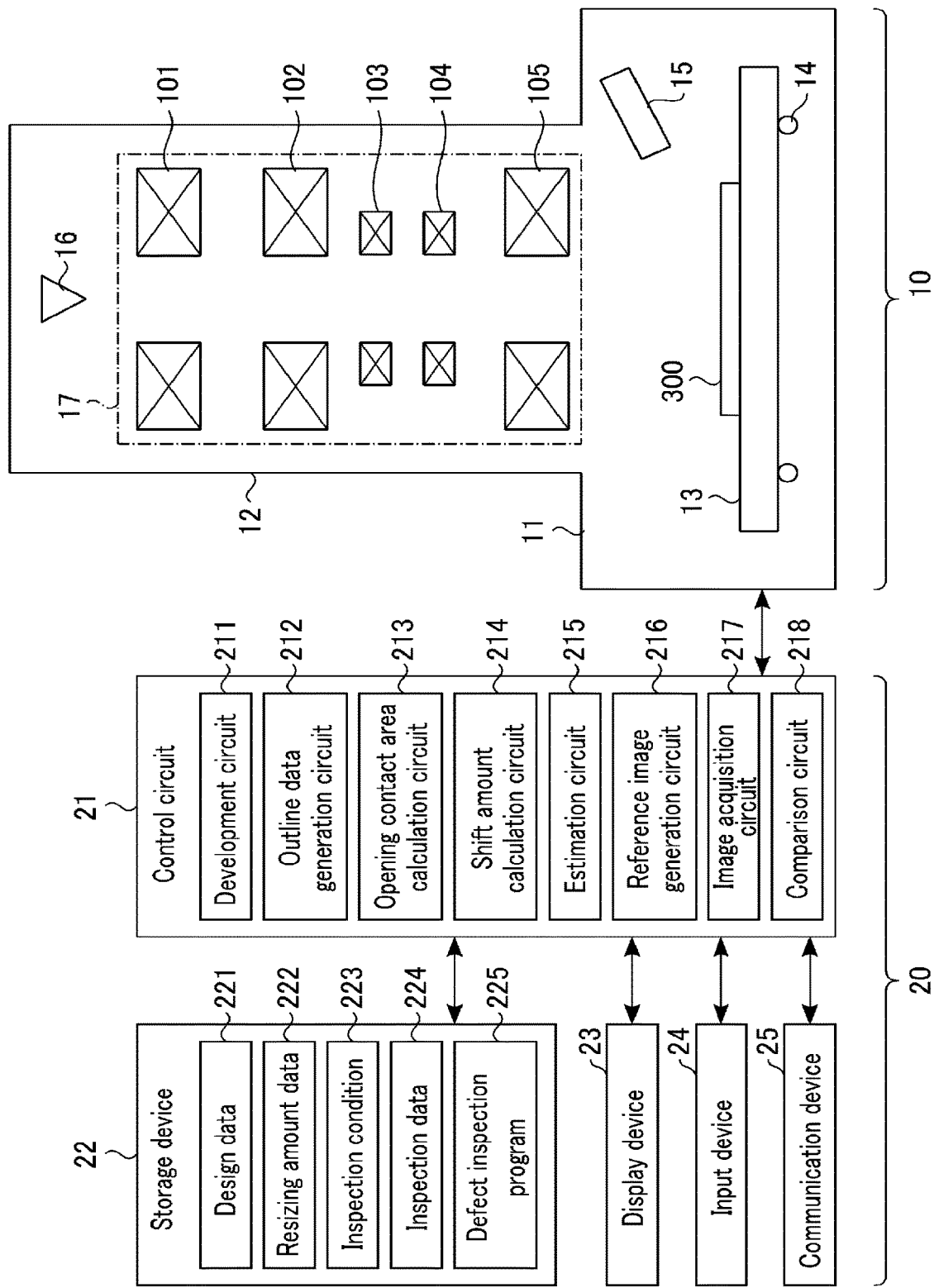
FIG. 1 is a diagram showing an overall configuration of an inspection apparatus according to a first embodiment.

The embodiments will now be described with reference to the drawings. The embodiment will exemplify apparatuses and methods for embodying the technical idea of the invention. The drawings are schematic or conceptual, and the dimensions, scales, etc., used in the drawings are not binding on actual products. The technical idea of the present invention is not specified by the shape, structure, arrangement, and the like of the structural elements.

Hereinafter, as an inspection apparatus for a sample, an inspection apparatus that captures an electron beam image (hereinafter, also referred to as an "SEM image" or a "real image") of a measurement target pattern using a scanning electron microscope (hereinafter, referred to as an "SEM") will be described. The inspection apparatus may capture an optical image of a pattern using an optical microscope, or may capture an optical image of light reflected by or transmitted through the sample using a light receiving element. A case will be described as the embodiment in which a sample of the inspection target is a mask, but the sample may be anything as long as patterns are formed on a surface thereof, such as a wafer or a substrate for use in a liquid crystal display device or the like.

1. FIRST EMBODIMENT

1.1 Overall Configuration of Inspection Apparatus

First, an example of the overall configuration of the inspection apparatus will be described with reference to FIG. 1. FIG. 1 is a diagram showing the overall configuration of an inspection apparatus 1.

As shown in FIG. 1, the inspection apparatus 1 includes an imaging mechanism 10 and a control mechanism 20.

The imaging mechanism 10 includes a sample chamber 11 and an optical column 12. The optical column 12 is disposed on the sample chamber 11. For example, the optical column 12 has a cylindrical shape extending perpendicularly with respect to the sample chamber 11. The surfaces of the sample chamber 11 and the optical column 12 that are in contact with each other are open. A space formed by the sample chamber 11 and the optical column 12 is maintained in a vacuum (decompressed) state using a turbo-molecular pump or the like.

A stage 13, a stage driving mechanism 14, and a detector 15 are provided in the sample chamber 11.

A sample (mask) 300 is placed on the stage 13. The stage 13 is movable in an X direction parallel to the surface of the stage 13 and in a Y direction parallel to the surface of the stage 13 and intersecting the X direction. Further, the stage 13 may be movable in a Z direction perpendicular to the surface of the stage 13, or may be rotatable around a rotation axis on the XY plane with the Z direction as the rotation axis.

The stage driving mechanism 14 includes a driving mechanism for moving the stage 13 in the X direction and the Y direction. The stage driving mechanism 14 may include, for example, a mechanism that moves the stage 13 in the Z direction or a mechanism that rotates the stage 13 around a rotation axis on the XY plane with the Z direction as the rotation axis.

The detector 15 detects secondary electrons, reflected electrons, or the like emitted from the sample. The detector 15 transmits a signal of the detected secondary electrons or reflected electrons, that is, data of the SEM image to an image acquisition circuit 217.

An electron gun 16 and an electron optical system 17, which are components of the SEM, are provided in the optical column 12.

The electron gun 16 is disposed so as to emit an electron beam toward the sample chamber 11.

The electron optical system 17 converges the electron beam emitted from the electron gun 16 and irradiates a predetermined position of the sample 300 with the converged electron beam. For example, the electron optical system 17 includes a plurality of focusing lenses 101 and 102, a plurality of scanning coils 103 and 104, and an objective lens 105. The electron beam emitted from the electron gun 16 is accelerated and then focused as an electron spot on the surface of the sample 300 placed on the stage 13 by the focusing lenses 101 and 102 and the objective lens 105. The scanning coils 103 and 104 control the position of the electron spot on the sample 300.

The control mechanism 20 includes a control circuit 21, a storage device 22, a display device 23, an input device 24, and a communication device 25.

The control circuit 21 performs total control over the inspection apparatus 1. More specifically, the control circuit 21 controls the imaging mechanism 10 to acquire the SEM image. Further, the control circuit 21 controls the control mechanism 20 to compare a generated reference image with an inspection image to detect a defect. That is, the control circuit 21 is a processor for executing a defect inspection.

For example, the control circuit 21 includes a central processing unit (CPU), a random access memory (RAM), and a read only memory (ROM), which are not illustrated. For example, the CPU loads a program stored in the ROM or the storage device 22 as a non-transitory storage medium into the RAM. Then, the control circuit 21 causes the CPU to interpret and execute the program loaded in the RAM to control the inspection apparatus 1. The control circuit 21 may be, for example, a CPU device such as a microprocessor, or a computer device such as a personal computer. The control circuit 21 may include a dedicated circuit (dedicated processor) in which at least a part of functions is performed by another integrated circuit, such as an application specific integrated circuit (ASIC), a field programmable gate alley (FPGA), or a graphics processing unit (GPU).

The control circuit 21 includes a development circuit 211, an outline data generation circuit 212, an opening contact area calculation circuit 213, a shift amount calculation circuit 214, an estimation circuit 215, a reference image generation circuit 216, an image acquisition circuit 217, and a comparison circuit 218. These may be configured by a program executed by the integrated circuit such as the CPU, the ASIC, the FPGA, the GPU, etc., may be configured by hardware or firmware included in the integrated circuit, or may be configured by discrete circuits controlled by the integrated circuit. A case will be described in which the control circuit 21 realizes the functions of the development circuit 211, the outline data generation circuit 212, the opening contact area calculation circuit 213, the shift amount calculation circuit 214, the estimation circuit 215, the reference image generation circuit 216, the image acquisition circuit 217, and the comparison circuit 218 by executing a program.

For example, the development circuit 211 develops design data 221 (figure data) stored in the storage device 22 into data for each pattern (figure), and interprets a figure code, figure dimensions, and the like which are indicating a figure shape of the figure data. Then, the development circuit 211 develops the design data 221 into a binary or multi-valued (for example, 8-bit) image (hereinafter, also referred to as a "CAD image" or a "developed image") as a figure pattern arranged in squares having a grid of a predetermined quantization size as a unit. The development circuit 211 calculates an occupancy rate of the figure for each pixel of the developed image. Thus, the calculated figure occupancy rate in each pixel is a pixel value. For example, in a case where the developed image is represented by 8-bit gradation data, the pixel value of each pixel is represented by a gradation value of 0 to 255. When the pixel value is 0, the figure occupancy rate is 0%, and when the pixel value is 255, the figure occupancy rate is 100%.

The outline data generation circuit 212 generates outline data of the design data 221 or the figure pattern of the developed image. The outline data includes information on outline points of the pattern and an outline connecting the outline points. In other words, it is data in which a representative value of coordinates through which an outline passes, that is, an outline point, and information on a normal direction of an outline vector at the outline point are stored for each pixel. In the present embodiment, the outline data generation circuit 212 generates outline points and outlines (hereinafter, referred to as a "CAD figure outline") of the figure pattern of the developed image as outline data. For example, the outline data generation circuit 212 transmits the outline data to the opening contact area calculation circuit 213 and the shift amount calculation circuit 214.

The opening contact area calculation circuit 213 calculates, for each outline point of the outline data, an area of a region not included in the pattern (hereinafter, referred to as an "opening contact area") in a circle centered on the outline point. The opening contact area is a value standardized with the area of the perfect circle as 1. The radius of the circle for which the opening contact area is calculated may be arbitrarily set. For example, the opening contact area calculation circuit 213 transmits data of the opening contact area to the estimation circuit 215.

The shift amount calculation circuit 214 calculates, as a shift amount, a distance between the outline data and an outline of the SEM image (actual image) (hereinafter, referred to as an "actual image outline") acquired from the image acquisition circuit 217. In the present embodiment, the shift amount calculation circuit 214 compares the CAD figure outline with the actual image outline. Then, the shift amount calculation circuit 214 calculates a distance (size of a relative vector) between the CAD figure outline and the actual image outline for each outline point (pixel). Therefore, in the present embodiment, the distance between the CAD figure outline and the actual image outline is defined as the shift amount.

The estimation circuit 215 is a circuit that estimates a function (hereinafter, described as a "resizing amount function") indicating the relationship between the opening contact area and the resizing amount. The estimation circuit 215 estimates the resizing amount function from the relationship between the shift amount and the opening contact area at the plurality of outline points. More specifically, the estimation circuit 215 calculates, for example, a regression curve from the relationship between the shift amount and the opening contact area at each of the plurality of outline points. The regression curve may be represented by a linear function or a quadratic or higher function. Then, the estimation circuit 215 estimates the radius and the resizing amount function that minimize the error of the regression curve. Note that the estimation circuit 215 may generate a table indicating the relationship between the shift amount and the opening contact area from the relationship between the shift amount and the opening contact area at each of the plurality of outline points.

Further, the estimation circuit 215 calculates the resizing amount used for the resizing process using the resizing amount function. Then, the estimation circuit 215 creates a resizing map representing the resizing amount for each pixel. For example, the estimation circuit 215 transmits the resizing map to the reference image generation circuit 216.

The reference image generation circuit 216 generates a reference image using the developed image. More specifically, the reference image generation circuit 216 executes the resizing process of the developed image based on the resizing map. Then, the reference image generation circuit 216 extracts an outline (hereinafter, referred to as a "reference outline") from the developed image after the resizing process to generate a reference image (outline image). For example, the reference image generation circuit 216 transmits the generated reference image to the comparison circuit 218.

The image acquisition circuit 217 acquires SEM image data from the detector 15 of the imaging mechanism 10. The image acquisition circuit 217 extracts an actual image outline from the SEM image (actual image) to generate an inspection image (outline image).

The comparison circuit 218 compares the inspection image with the reference image using an appropriate algorithm to detect a defect. More specifically, the comparison circuit 218 performs alignment between the inspection image and the reference image. The comparison circuit 218 measures a distortion amount of the inspection image in the plane of the sample 300 based on the alignment result, and calculates a distortion coefficient. The comparison circuit 218 calculates a misalignment amount of each pixel based on the alignment result and the distortion amount. The misalignment amount indicates a distance (magnitude of a relative vector) between the reference outline and the actual image outline. When the misalignment amount exceeds a preset threshold value, the comparison circuit 218 determines that there is a defect in the corresponding pixel (coordinate position) of the sample 300.

The storage device 22 stores data and programs related to defect inspections. For example, the storage device 22 stores design data 221, resizing amount data 222, a parameter 223 of inspection conditions, inspection data 224, and the like. The design data 221 is design data of the sample 300. The resizing amount data 222 includes outline data, an opening contact area, a shift amount, a resizing map, a resizing amount function, and the like. The parameter 223 of inspection conditions includes, for example, imaging conditions of the imaging mechanism 10 and defect detection conditions (such as a threshold and an algorithm). The inspection data 224 includes, for example, information related to the misalignment amount between the inspection image and the reference image, image data (the developed images, the reference images, the SEM images, and the inspection images), and data (coordinates, size, and the like) related to the detected defects. The storage device 22 stores a defect inspection program 225 as a non-transitory storage medium. The defect inspection program 225 is a program for causing the control circuit 21 to execute the defect inspection.

The storage device 22 may include, as external storages, various storage devices such as a magnetic disk storage device (hard disk drive: HDD), a solid state drive (SSD), and the like. Further, the storage device 22 may include, for example, a drive for reading a program stored in a compact disc (CD), a digital versatile disc (DVD), or the like as a non-transitory storage medium. The display device 23 includes, for example, a display screen (for example, a liquid crystal display (LCD) or an electroluminescence (EL) display). The display device 23 displays, for example, a defect detection result under the control of the control circuit 21.

The input device 24 is an input device such as a keyboard, a mouse, a touch panel, or a button switch. The communication device 25 is a device for connecting to a network in order to transmit and receive data to and from an external device. Various communication standards may be used for the communication. For example, the communication device 25 receives design data from the external device, and transmits a result of defect inspection and the like to the external device.

1.2 Overall Flow of Inspection Process

Next, an example of an overall flow of a defect inspection process will be described with reference to FIG. 2. FIG. 2 is a flowchart showing the overall flow of the inspection process.

As shown in FIG. 2, the inspection process roughly includes an estimation process of the resizing amount function (step S1) and a defect inspection process (step S2).

The estimation process of the resizing amount function is a process of executing an estimation process of the resizing amount function used for the defect inspection before executing the defect inspection of the sample 300. The estimation process of the resizing amount function is executed using a plurality of preset estimation regions in the sample 300. The estimation region is a region including a pattern used for the estimation process of the resizing amount function in the sample 300.

The defect inspection process is a process of performing a defect inspection of the sample 300.

1.2.1 Estimation Process of Resizing Amount Function

Next, an example of the estimation process of the resizing amount function in step S1 will be described with reference to FIG. 3. FIG. 3 is a flowchart of the estimation process of the resizing amount function.

As shown in FIG. 3, steps S101 to S111 are executed as the estimation process of the resizing amount function. Details of each step will be described.

[Step S101]

The control circuit 21 determines whether or not the resizing amount data 222 (resizing amount function) of the inspection executed in the past stored in the storage device 22 is used. For example, in a case where the inspection of the same or similar sample as the sample 300 of the current inspection has been executed in the past, the control circuit 21 may use past data. The same or similar sample is a sample having the same mask name, mask series, or pattern type and minimum dimension, for example, as the sample 300 to be inspected this time. Whether or not the past data is used may be determined by the user (operator) of the inspection apparatus 1, or may be determined by the control circuit 21 based on the information of the sample 300 (the mask name, the design data 221, or the like).

[Step S102]

When the past data is used (step S101_Yes), the control circuit 21 reads the past resizing amount data 222, that is, the resizing amount function from the storage device 22. After reading the resizing amount function, the control circuit 21 ends the estimation process of the resizing amount function.

[Step S103]

When the past data is not used (step S101 No), the control circuit 21 determines the function type of the resizing amount function. More specifically, the control circuit 21 determines the order of the regression curve or the generation of the table. The order of the regression curve or the table generation may be determined by the operator.

[Step S104]

Next, the control circuit 21 selects an estimation region. The estimation region may be selected by the operator or may be selected by the control circuit 21 based on the design data 221.

[Step S105]

Next, the image acquisition circuit 217 acquires the SEM image of the estimation region from the imaging mechanism 10. Then, the image acquisition circuit 217 extracts an actual image outline of the estimation region from the SEM image.

[Step S106]

Next, the development circuit 211 generates a developed image of the estimation region based on the design data 221. Note that step S106 may be executed before or simultaneously with step S105.

[Step S107]

Figure 4:
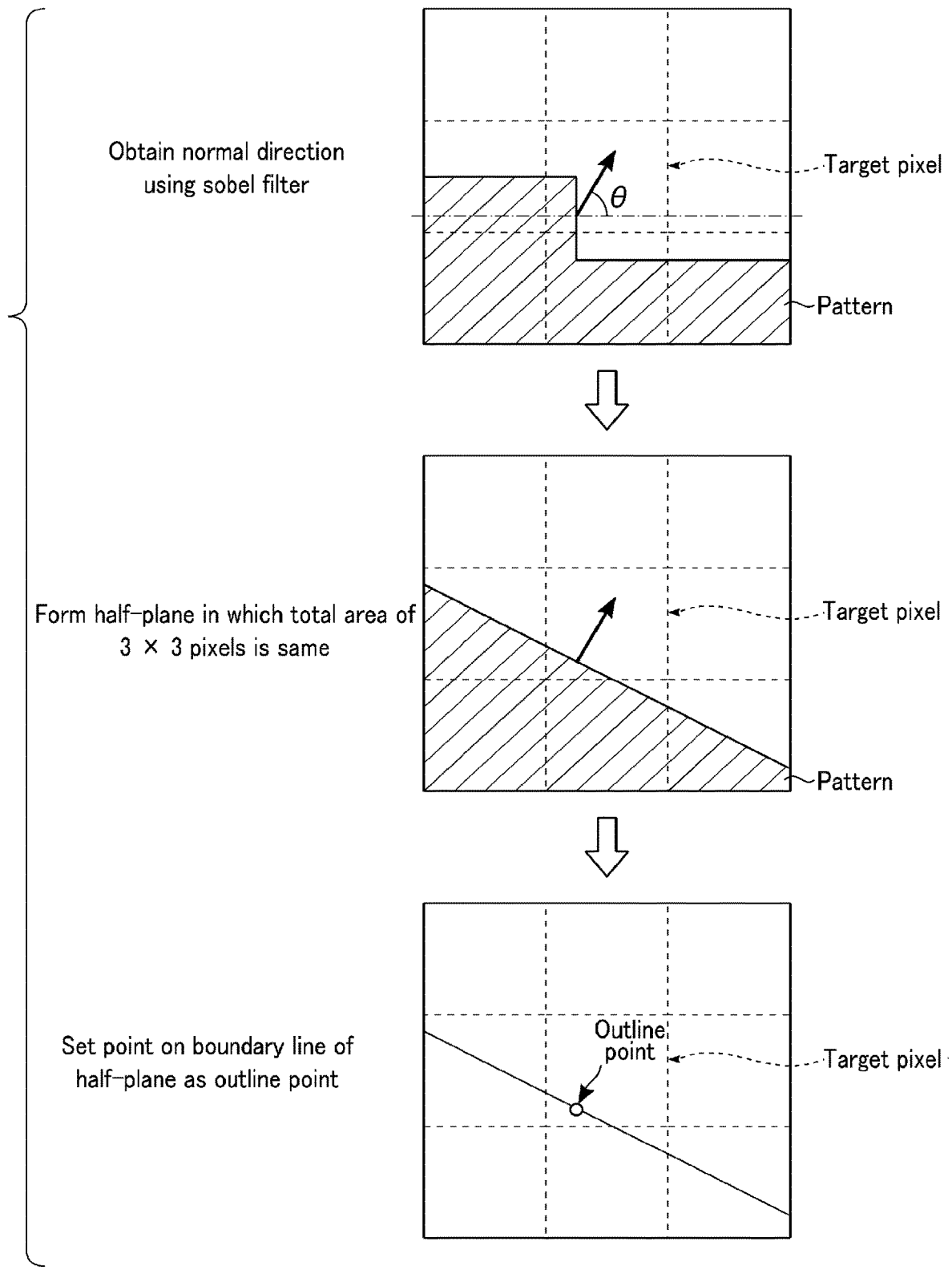
FIG. 4 is a diagram showing an example of outline point extraction in the inspection apparatus according to the first embodiment.

Next, the outline data generation circuit 212 generates outline data of a pattern in the estimation region based on the developed image of the estimation region. In the present embodiment, an outline point and a CAD figure outline are generated as outline data. An example of outline point extraction will be described with reference to FIG. 4. FIG. 4 is a diagram showing an example of outline point extraction. Note that, in FIG. 4, the pattern visualizes a pattern (figure) on the design data 221, and each pixel of the developed image has a gradation value corresponding to the figure occupancy rate. Therefore, the total of the gradation values of the developed image is proportional to the area of the figure of the region. In the example of FIG. 4, a case where outline points are extracted using a Sobel filter will be described. Note that the filter used to extract the outline points is not limited to the Sobel filter.

As shown in FIG. 4, first, the outline data generation circuit 212 obtains the normal direction of the outline at the target pixel using the Sobel filter in the 3×3 developed image centered on the target pixel including the pattern edge. More specifically, the outline data generation circuit 212 performs convolution operations with the kernels in the X direction and the Y direction of the Sobel filter on the developed image. Then, in the target pixel, the outline data generation circuit 212 calculates the normal angle θ of the outline vector obtained by combining the arithmetic value for the X direction and the arithmetic value for the Y direction. For example, assuming that the value in the X direction after the Sobel filter processing is Fx and the value in the Y direction is Fy, it is expressed by an expression of θ=a tan (Fy/Fx).

Next, the outline data generation circuit 212 forms a half-plane in which the sum of the pixel values (gradation values) of the 3×3 developed image (that is, the total area of 3×3 pixels) is the same and the boundary line is perpendicular to the outline vector obtained by the Sobel filter.

Next, the outline data generation circuit 212 sets an outline point at a position that is a midpoint between the X direction and the Y direction on the boundary line of the half-plane. The outline point may be set in each pixel on a sub-pixel basis.

[Step S108]

Figure 5:
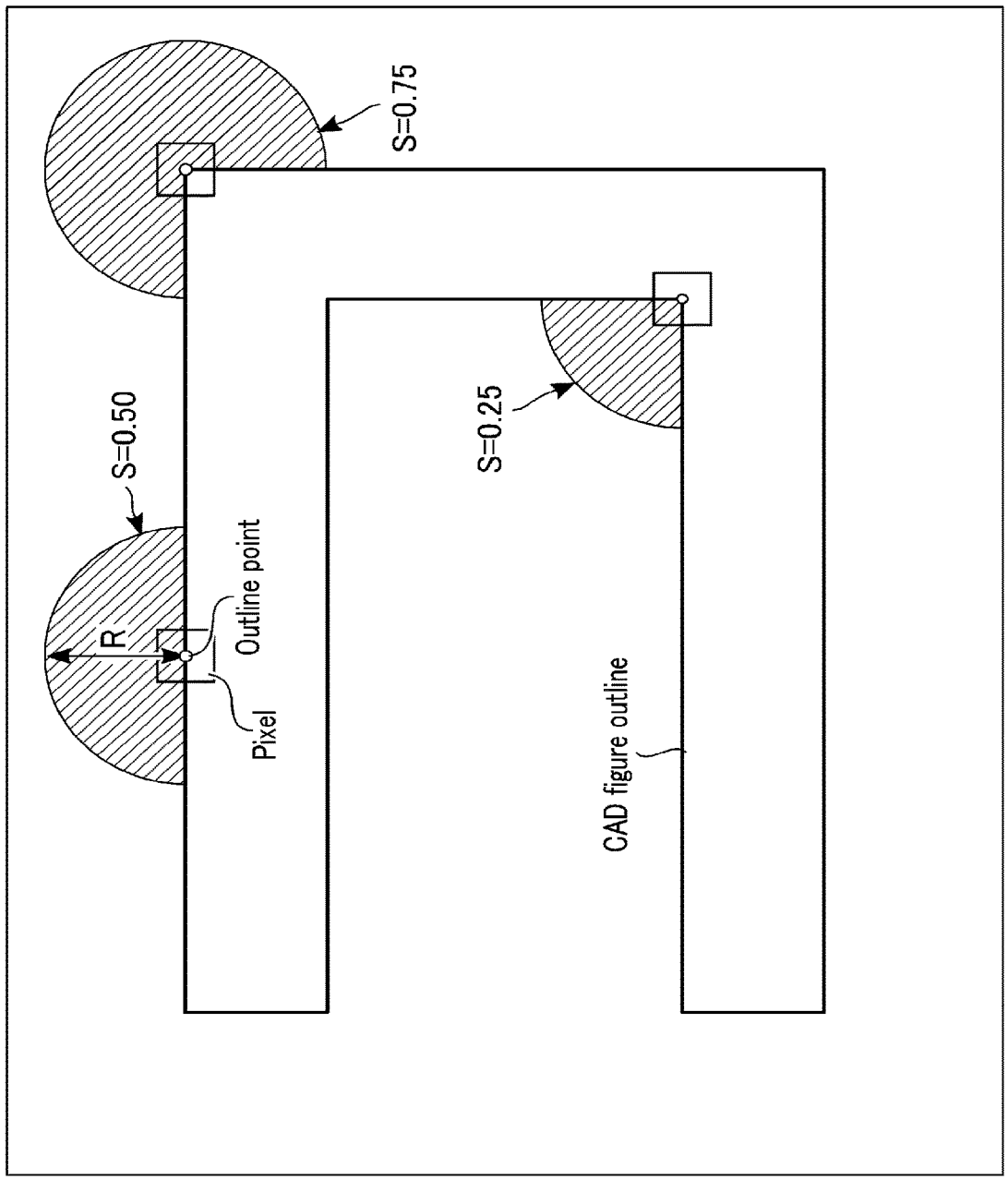
FIG. 5 is a diagram showing a relationship between a CAD figure outline of an estimation region and an opening contact area in the inspection apparatus according to the first embodiment.

Next, the opening contact area calculation circuit 213 calculates the opening contact area at each outline point (each pixel) of the estimation region. At this time, the opening contact area calculation circuit 213 may set a plurality of radii R of a circle centered on the outline point. Then, the opening contact area calculation circuit 213 calculates the opening contact area for each radius R. Note that the radius R may be set by the operator, or may be set by the control circuit 21 based on past data, for example. An example of calculation of the opening contact area will be described with reference to FIG. 5. FIG. 5 shows the relationship between the CAD figure outline and the opening contact area in the estimation region. Note that, in order to simplify the description, the example of FIG. 5 shows the opening contact area in some pixels including the outline point.

As shown in FIG. 5, the opening contact area calculation circuit 213 calculates the opening contact area at each outline point. For example, when the outline point is on a straight line of the CAD figure outline, the opening is semicircular, so that an opening contact area S is 0.50. Similarly, when the outline point is on a 90 degree corner of the CAD figure outline, the opening contact area S is 0.75. Furthermore, when the outline point is on a 270 degree corner of the CAD figure outline, the opening contact area S is 0.25.

[Step S109]

Figure 6:
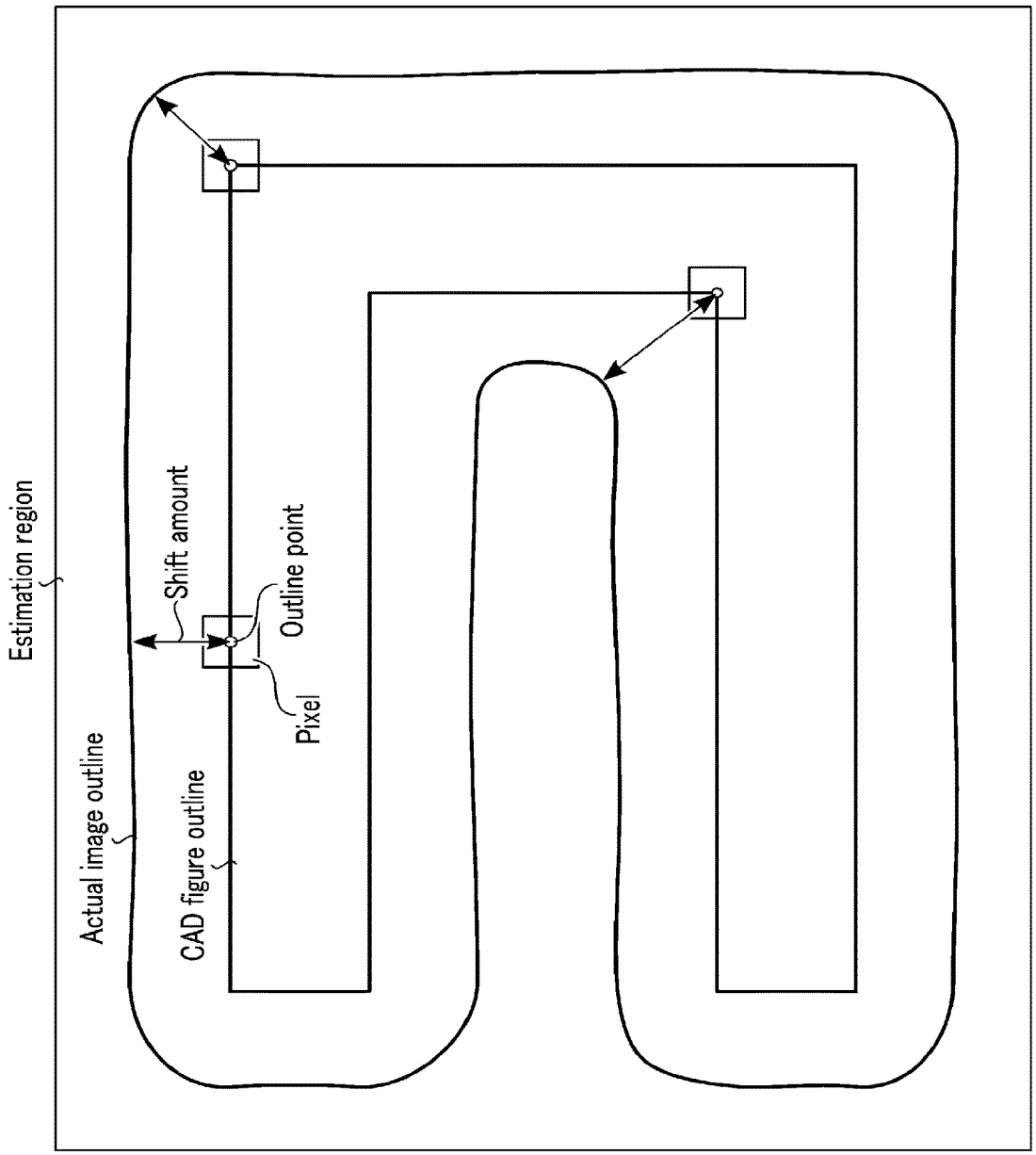
FIG. 6 is a diagram showing a relationship between an actual image outline, a CAD figure outline and a shift amount of the estimation region in the inspection apparatus according to the first embodiment.

Next, the shift amount calculation circuit 214 calculates the shift amount at each outline point (each pixel) of the estimation region. An example of shift amount calculation in the estimation region will be described with reference to FIG. 6. FIG. 6 shows a relationship between an actual image outline, a CAD figure outline, and a shift amount of the estimation region. The shift amount is set as a distance at which a straight line extending in the normal direction of the reference outline intersects the actual image outline. Note that, in the example of FIG. 6, in order to simplify the description, the shift amount in a part of the pixel including the outline point is shown. In the example of FIG. 6, the actual image outline is expanded with respect to the CAD figure outline, but the actual image outline may be reduced with respect to the CAD figure outline.

As shown in FIG. 6, the shift amount calculation circuit 214 calculates a distance between each outline point of the CAD figure outline and the actual image outline as the shift amount.

Note that the order of steps S108 and S109 may be changed.

[Step S110]

Next, the estimation circuit 215 estimates a function coefficient having the minimum error, that is, a regression curve, for each radius R.

First, an example in which the estimation circuit 215 calculates a regression curve representing the relationship between the shift amount and the opening contact area will be described with reference to FIGS. 7 and 8. FIG. 7 is a graph showing an example in which a regression curve of a linear function is calculated from a relationship between a standard value of the shift amount and an opening contact area having a radius R=2. FIG. 8 is a graph showing an example in which a regression curve of a linear function is calculated from a relationship between a standard value of the shift amount and an opening contact area having a radius R=4. Note that the examples of FIGS. 7 and 8 show a case where opening contact areas of different radii R corresponding to the same pattern, that is, the same shift amount are calculated.

As shown in FIG. 7, the estimation circuit 215 calculates a regression curve from a relationship between a standard value of the shift amount and an opening contact area having a radius R=2. A white circle in FIG. 7 indicates a value obtained by standardizing the shift amount. A thick solid line indicates a regression curve. If the functional type of the regression curve is as a linear function, the regression curve can be expressed as y=0.7944x+0.1996 in the example of FIG. 7. Here, x is an opening contact area. y is a standard value of the shift amount. In the example of FIG. 7, the determination coefficient of the regression curve representing the goodness (degree) of fit of the estimated regression equation is, for example, 0.8664. Since this example is a single regression, the square of the correlation coefficient is used as the determination coefficient, and the larger the value is, the better the fitting is. As the determination coefficient, for example, a root mean square error (RMSE) of the sum of squares of residuals can be selected. In the case of RMSE, the smaller the value is, the better the fitting is.

As shown in FIG. 8, the estimation circuit 215 calculates a regression curve from a relationship between a standard value of the shift amount and an opening contact area having a radius R=4. If the functional type of the regression curve is as a linear function, the regression curve can be expressed as y=0.8288x+0.2816 in the example of FIG. 8. In the example of FIG. 8, the determination coefficient of the regression curve is, for example, 0.8242.

Note that the estimation circuit 215 may generate a table instead of the regression curve. An example in which the estimation circuit 215 generates a table representing the relationship between the shift amount and the opening contact area will be described with reference to FIGS. 9 and 10. FIG. 9 is a graph showing an example in which an average value for each arbitrary section of the opening contact area is calculated from a relationship between a standard value of the shift amount and an opening contact area having a radius R=2. FIG. 10 is a table based on the average value described in FIG. 9.

As shown in FIG. 9, for example, the estimation circuit 215 divides the opening contact area into 0.05 sections, and calculates the average value of the standard values of the shift amounts in the respective sections. A white circle in FIG. 9 indicates a value obtained by standardizing the shift amount. The black squares indicate the average value of the sections. The estimation circuit 215 generates the table shown in FIG. 10 based on the average value for each section. The opening contact area of the table indicates an upper limit value in each section. For example, if the opening contact area is 0.41, the estimation circuit 215 refers to the table and sets the standard value of the shift amount to 0.547. For example, if 0.547 is multiplied by a constant used for standardizing the shift amount, the resizing amount is calculated.

[Step S111]

Next, the estimation circuit 215 determines the radius R and the function coefficient having the minimum error. For example, the estimation circuit 215 compares the regression curve with the radius R=2 and the regression curve with R=4 described with reference to FIGS. 7 and 8. As a result, since the determination coefficient 0.8664 for the radius R=2 is larger than the determination coefficient 0.8242 for the radius R=4, the estimation circuit 215 selects the radius R=2. Here, since the determination coefficient is the square of the correlation coefficient, R having a larger numerical value was selected. For example, when the determination coefficient is RMSE, R having a smaller numerical value is selected. Then, the estimation circuit 215 estimates, for example, Rs(n)=0.7944a×S(n)+0.1996 as a function for calculating the resizing amount.

Here, Rs (n) is a resizing amount. "a" is a constant used for standardization of the shift amount. For example, the constant "a" is the maximum value of the shift amount. S(n) is an opening contact area. The variable n is an integer indicating the number of the outline point (pixel). 0.7794 and 0.1996 are coefficients of the regression curve when the radius R=2 calculated in step S110. As a result, the estimation process of the resizing amount function ends.

In the present embodiment, the resizing amount function is estimated based on the two radii R (R=2 and R=4). However, three or more radii R may be set.

1.2.2 Defect Inspection Process

Figure 11:
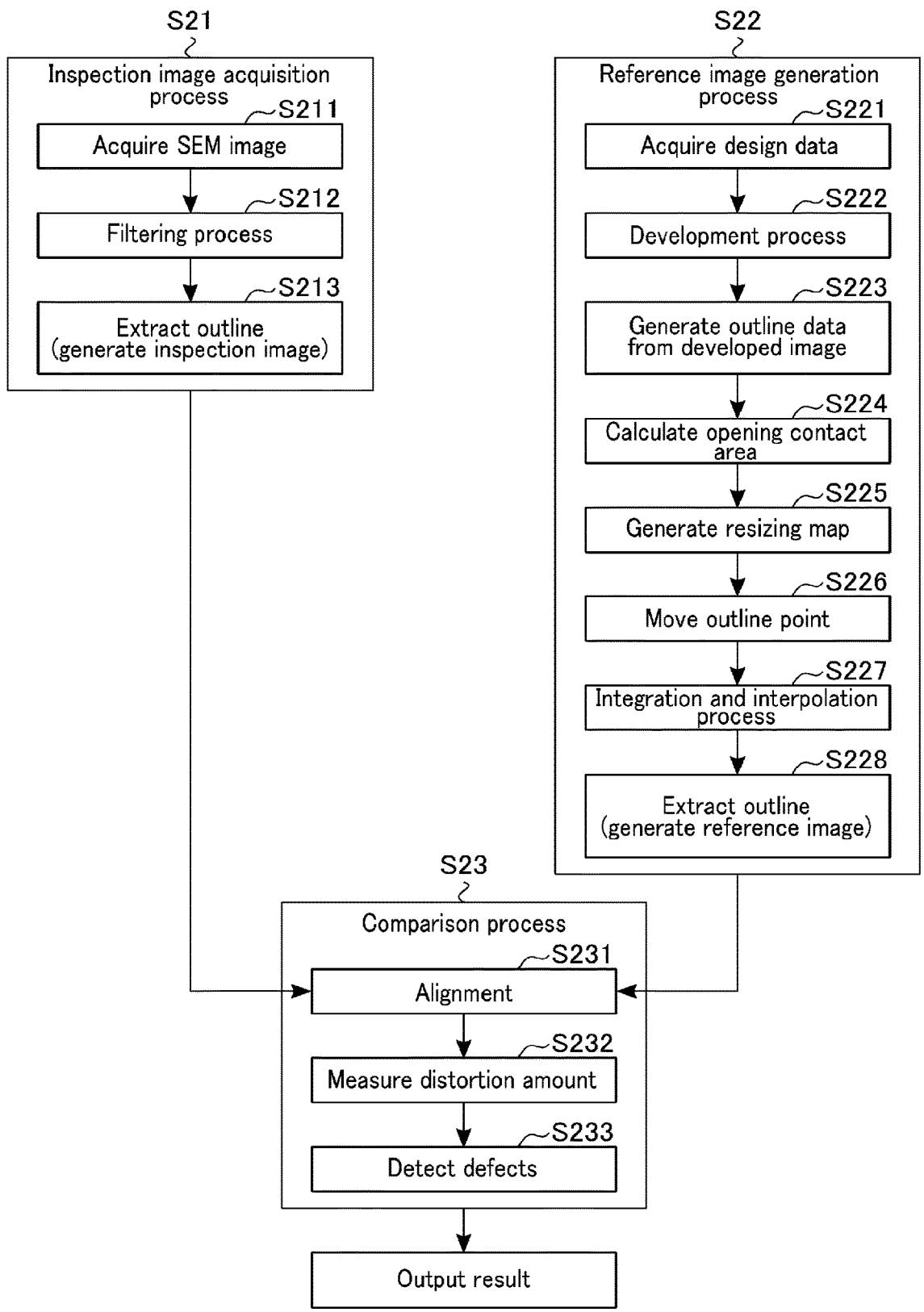
FIG. 11 is a flowchart of a defect inspection process in the inspection apparatus according to the first embodiment.

Next, an example of the defect inspection process in step S2 will be described with reference to FIG. 11. FIG. 11 is a flowchart of the defect inspection process.

As shown in FIG. 11, the defect inspection process includes an inspection image acquisition process (step S21), a reference image generation process (step S22), and a comparison process (step S23).

1.2.2.1 Inspection Image Acquisition Step

First, an example of the inspection image acquisition process in step S21 will be described.

As shown in FIG. 11, steps S211 to S213 are executed as the inspection image acquisition step. Details of each step will be described.

[Step S211]

First, the image acquisition circuit 217 acquires the SEM image of the sample 300 from the imaging mechanism 10.

[Step S212]

Next, the image acquisition circuit 217 performs a filtering process to remove noise from the acquired SEM image. For the filter processing, a general filter such as a Gaussian filter or a bilateral filter can be used.

[Step S213]

Next, the image acquisition circuit 217 extracts an actual image outline of each pattern from the SEM image after the filter processing. That is, the image acquisition circuit 217 generates an inspection image (outline image). A method of extracting an outline position may be a conventional method. For example, differential filtering is performed in the x and y directions using a Sobel filter or the like, and the inclination direction of the actual image is obtained from each differential value. Then, a gradation value profile in the inclination direction of the actual image is obtained, and a peak position thereof is extracted as an outline position on the outline (actual image outline).

The image acquisition circuit 217 transmits the generated inspection image to, for example, the comparison circuit 218 and the storage device 22.

1.2.2.2 Reference Image Generation Process

Next, an example of the reference image generation process in step S22 will be described.

As shown in FIG. 11, steps S221 to S228 are executed as the reference image generation process. Details of each step will be described.

[Step S221]

First, the control circuit 21 acquires the design data 221 from the storage device 22.

[Step S222]

Next, the development circuit 211 performs a development process to develop (convert) the design data 221 into, for example, 8-bit image data (developed image). The development circuit 211 transmits the developed image to, for example, the outline data generation circuit 212 and the storage device 22.

[Step S223]

Figure 12:
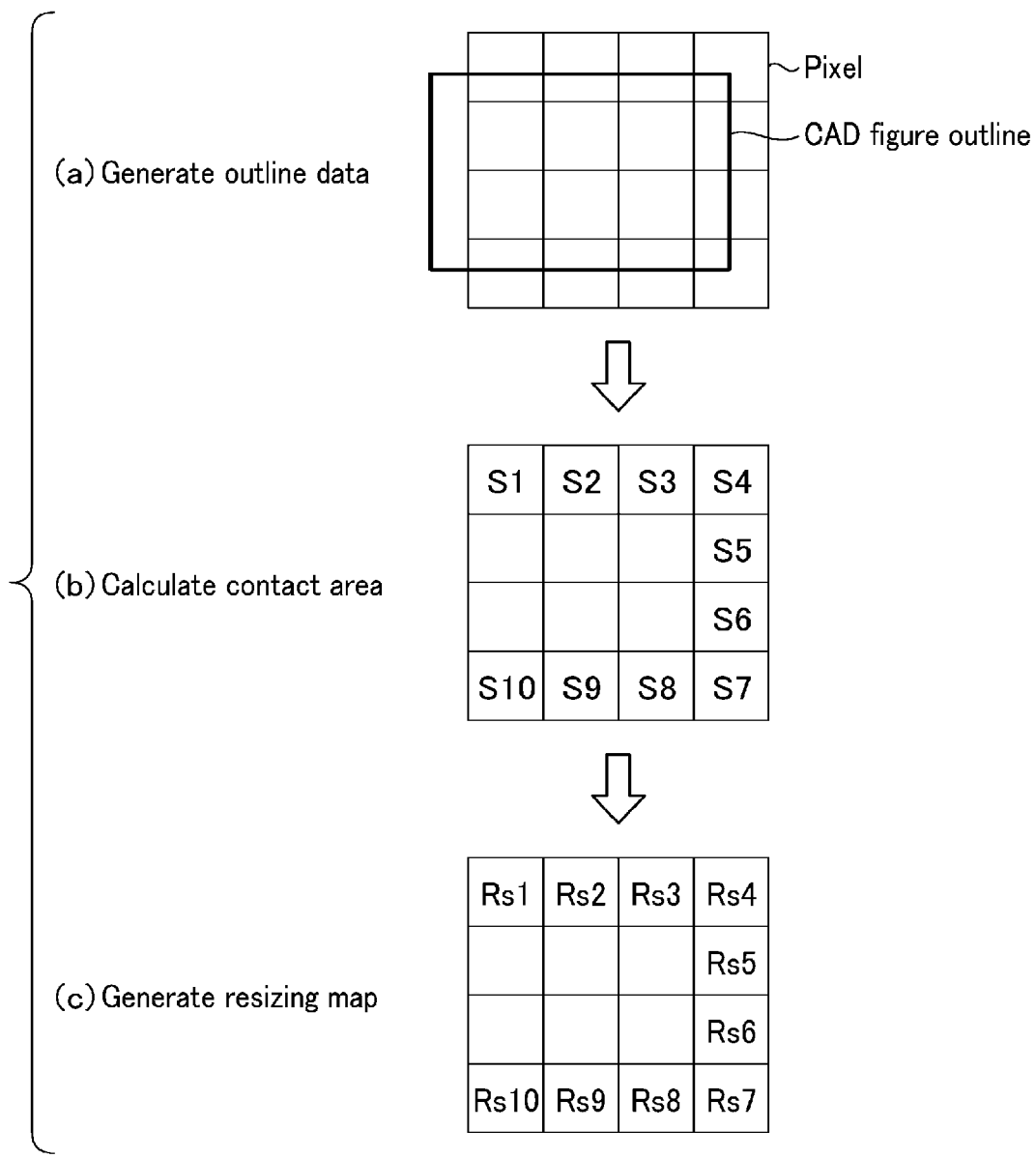
FIG. 12 is a diagram showing an example of processes from outline data generation to resizing map generation in the inspection apparatus according to the first embodiment.

Next, the outline data generation circuit 212 generates outline data based on the developed image, similarly to step S107 of the estimation process of the resizing amount function. The outline data generation circuit 212 of the present embodiment generates an outline point and a CAD figure outline based on the figure pattern of the developed image. An example of the outline data is shown in FIG. 12. FIG. 12 is a diagram showing an example of processes from outline data generation to resizing map generation. Note that, in order to simplify the description, the example of FIG. 12 shows 4×4 pixels corresponding to a part of the figure pattern.

As shown in FIG. 12 (*a*), an outline point and a CAD figure outline, which are not illustrated, are generated as outline data.

[Step S224]

Next, the opening contact area calculation circuit 213 calculates the opening contact area in each pixel including the outline point (CAD image outline) using the radius R determined by the estimation process of the resizing amount function. FIG. 12 (*b*) is a map showing the opening contact area of each pixel. The opening contact area calculation circuit 213 according to the present embodiment calculates opening contact areas S1 to S10 for 10 pixels including outline points (CAD figure outlines), respectively, and generates a map.

[Step S225]

Next, the estimation circuit 215 calculates the resizing amount in each pixel using the resizing amount function and generates a resizing map. FIG. 12 (*c*) is a resizing map. The estimation circuit 215 calculates the resizing amounts Rs1 to Rs10 corresponding to the opening contact areas S1 to S10 using the resizing amount function, and generates a resizing map.

[Step S226]

In the present embodiment, the reference image generation circuit 216 executes, as the resizing process, the movement of the outline point in step S226 and the integration and interpolation process in step S227.

First, the reference image generation circuit 216 moves the outline point of the outline data. More specifically, the reference image generation circuit 216 moves the outline point in the direction of the outline vector described with reference to FIG. 4 based on the resizing map.

[Step S227]

Next, the reference image generation circuit 216 executes the integration and interpolation process of outline points. An example of the integration and interpolation process will be described with reference to FIGS. 13 and 14. FIG. 13 is a diagram showing an example of a case where a figure pattern is reduced by a resizing process. FIG. 14 is a diagram showing an example of a case where a figure pattern is expanded by the resizing process.

As shown in FIG. 13, when the figure pattern is reduced by movement of outline points, one pixel may include a plurality of outline points. In such a case, for example, the reference image generation circuit 216 provides an integrated outline point at centroid positions of a plurality of outline points in a pixel, and uses the integrated outline point as an outline point in the pixel.

As shown in FIG. 14, when the figure pattern expands due to the movement of the outline points, there is a case where a pixel that does not include an outline point exists between two outline points in a pixel including an outline. In other words, the two outline points may be separated by one or more pixels. In such a case, for example, the reference image generation circuit 216 provides an interpolated outline point in a pixel between two outline points, and uses the interpolated outline point as an outline point in the pixel. As the interpolation process, a general interpolation process can be used. For example, it is preferable that interpolation of outline points is performed by Lagrange interpolation to draw an outline, and a point on the outline close to the center of the pixel is set as the outline point.

[Step S228]

Next, the reference image generation circuit 216 generates a reference image (outline image) based on the outline points subjected to the resizing process. The reference image generation circuit 216 transmits the generated reference image to the comparison circuit 218 and the storage device 22.

1.2.2.3 Comparison Process

Next, an example of a comparison process in step S23 will be described.

As shown in FIG. 11, steps S231 to S233 are executed as the comparison process. Details of each step will be described.

[Step S231]

First, the comparison circuit 218 executes alignment using the inspection image and the reference image. That is, the comparison circuit 218 performs alignment between the patterns in the inspection image and the patterns in the reference image. At this time, the comparison circuit 218 obtains a relative vector between the position of the actual image outline and the position of the reference outline. Then, the comparison circuit 218 calculates the average value of the relative vectors in each pattern as the alignment shift amount of the inspection image with respect to the reference image. Other general methods can be used to calculate the alignment shift amount.

[Step S232]

Next, the comparison circuit 218 measures a distortion amount of the inspection image, and calculates a distortion coefficient. For example, misalignment may occur between coordinate information based on the design data 221 and coordinates of the pattern calculated from the captured image due to the stage movement accuracy, the distortion of the sample 300, or the like. The comparison circuit 218 measures, for example, the distortion amount of the inspection image from the distribution of the local alignment shift amounts in the surface of the sample 300, and calculates the distortion coefficient.

[Step S232]

Next, the comparison circuit 218 calculates a misalignment amount between the actual image outline and the reference outline for each pixel based on the relative vector and the distortion coefficient. Then, the comparison circuit 218 detects defects based on the misalignment amount. When the misalignment amount exceeds the threshold value, the target pixel is determined to be defective. After storing the result of the defect inspection in the storage device 22, the control circuit 21 may display the result on the display device 23, or may output the result to an external device (for example, a review device or the like) via the communication device 25.

1.3 Advantages of Embodiment

In the defect inspection, when the inspection image (actual image outline) is compared with the reference image (reference outline), a misalignment occurs between the actual outline and the reference outline due to the dimension shift of the pattern. The amount of misalignment varies depending on the shape of the pattern. For this reason, when the pattern becomes complicated, it becomes difficult to improve the degree of coincidence between the actual image outline and the reference outline by the resizing process.

On the other hand, with the configuration according to the present embodiment, the inspection apparatus can calculate the shift amount for each outline point (pixel). The inspection apparatus can calculate the opening contact area for each outline point (pixel). The inspection apparatus can estimate the resizing amount function from the relationship between the shift amount and the opening contact area. The inspection apparatus can calculate the resizing amount in the defect inspection process using the resizing amount function and generates a resizing map. Accordingly, the inspection apparatus can calculate the optimum resizing amount for each outline point. Therefore, the degree of coincidence between the inspection image and the reference image can be improved. Therefore, it is possible to reduce the extraction of the pseudo defect by the defect inspection and improve the reliability of the defect inspection. Furthermore, in the configuration according to the present embodiment, the resizing amount function calculates the resizing amount based on the opening contact area. Therefore, it is possible to suppress a decrease in the degree of coincidence between the inspection image and the reference image due to complication of the pattern.

2. SECOND EMBODIMENT

Next, a second embodiment will be described. In the second embodiment, a case where outline data is directly generated from the design data 221 will be described. Hereinafter, differences from the first embodiment will be mainly described.

2.1 Estimation Process of Resizing Amount Function

Figure 15:
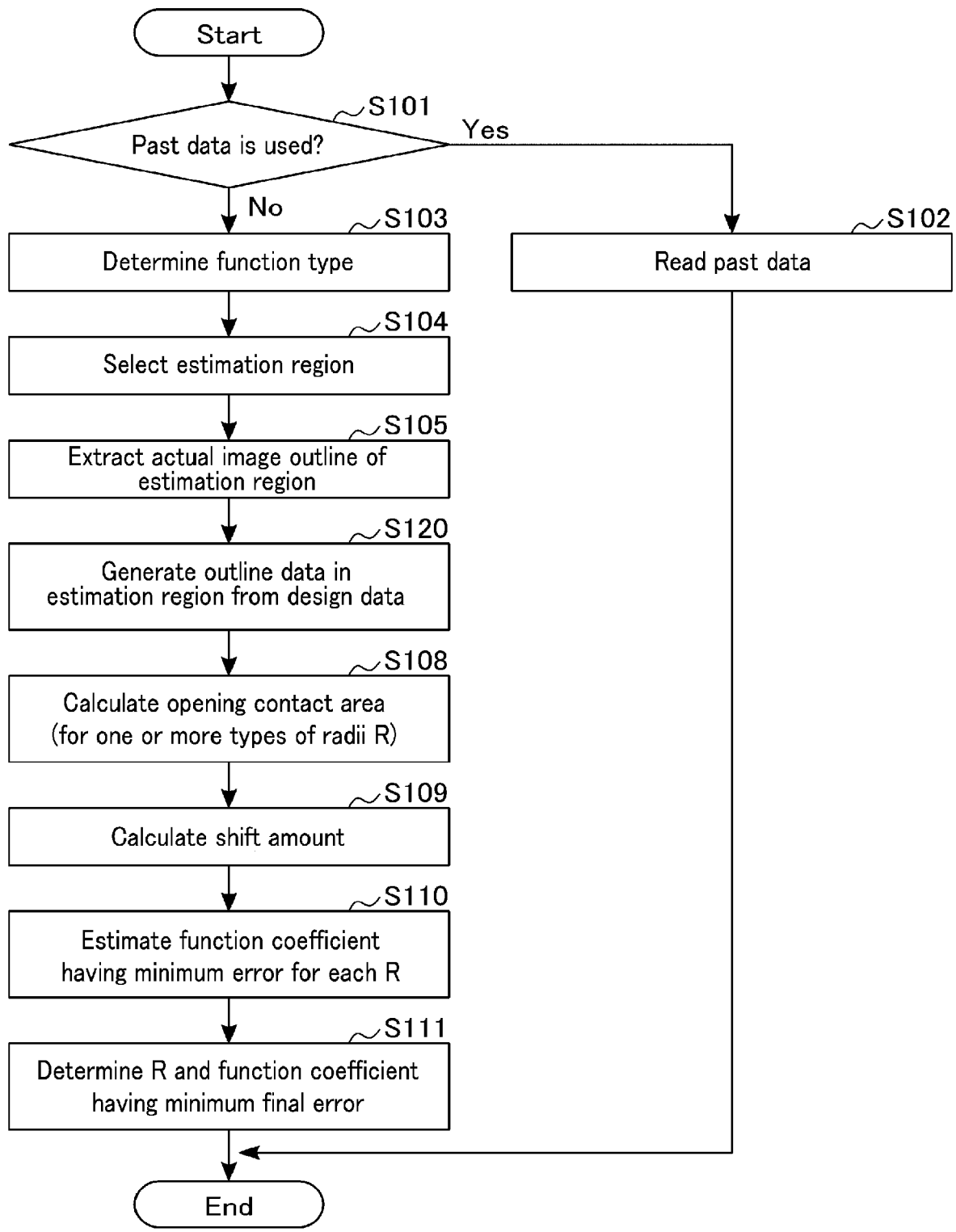
FIG. 15 is a flowchart of estimation process of a resizing amount function in the inspection apparatus according to a second embodiment.

First, an example of the estimation process of the resizing amount function will be described with reference to FIG. 15. FIG. 15 is a flowchart of the estimation process of the resizing amount function.

As shown in FIG. 15, first, steps S101 to S105 are executed similarly to the first embodiment.

[Step S120]

After step S105 is executed, the outline data generation circuit 212 of the present embodiment generates outline data of a pattern in the estimation region based on the design data 221 of the estimation region.

[Step S108]

Next, the opening contact area calculation circuit 213 of the present embodiment calculates the opening contact area at each outline point of the estimation region. In the present embodiment, the opening contact area calculation circuit 213 calculates a region not included in the pattern in a circle centered on the outline point of the design data 221 as the opening contact area. At this time, the opening contact area calculation circuit 213 may set a plurality of radii R of a circle centered on the outline point. Then, the opening contact area calculation circuit 213 calculates the opening contact area for each radius R.

[Step S109]

Next, the shift amount calculation circuit 214 of the present embodiment calculates the shift amount at each outline point of the estimation region. The shift amount calculation circuit 214 of the present embodiment calculates a distance between an outline point in the design data 221 and an actual image outline as a shift amount.

Next, steps S110 to Sill are executed similarly to the first embodiment. As a result, the resizing amount function is estimated.

2.2 Defect Inspection Process

Figure 16:
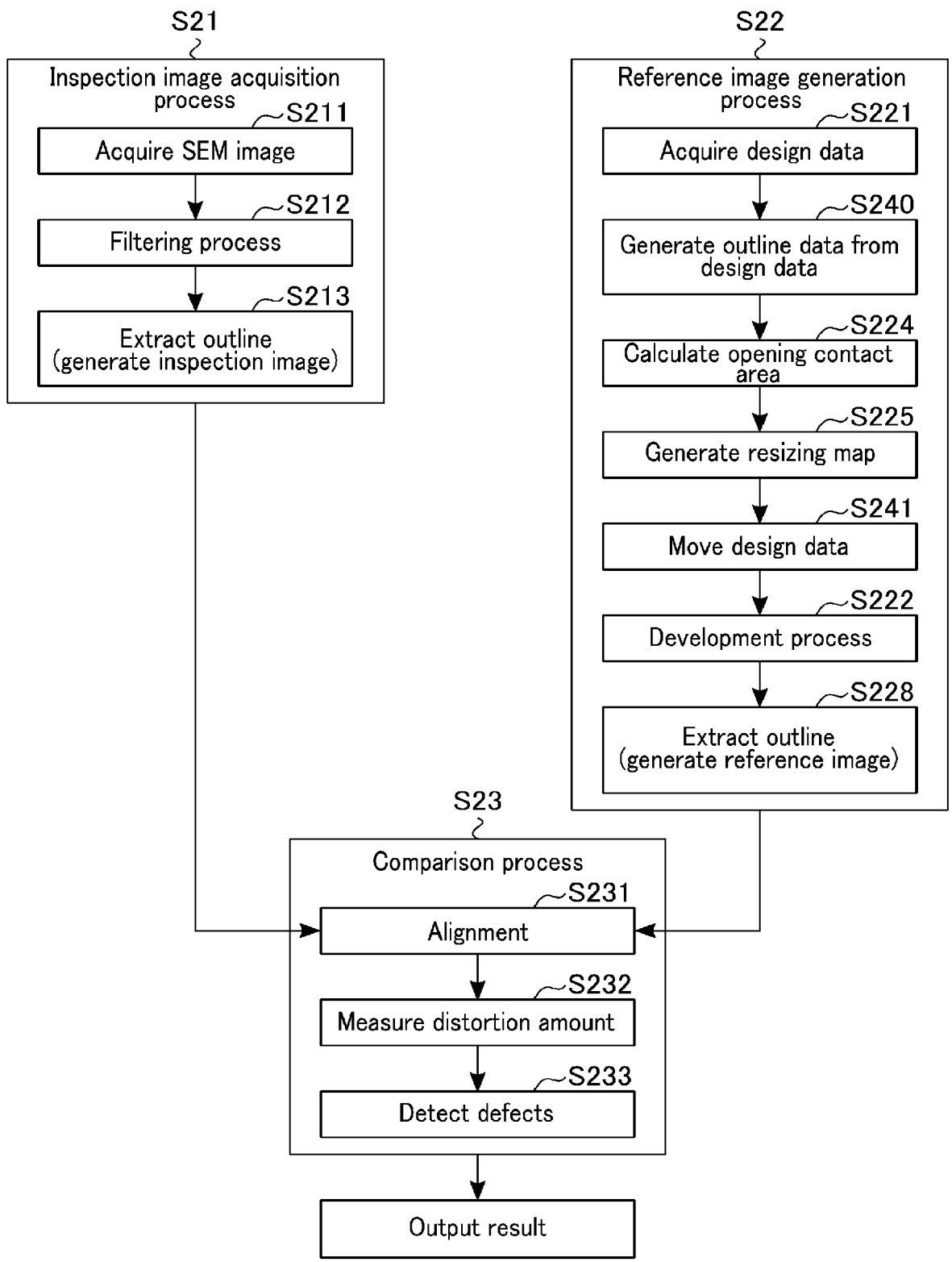
FIG. 16 is a flowchart of a defect inspection process in the inspection apparatus according to the second embodiment.

Next, an example of the defect inspection process will be described with reference to FIG. 16. FIG. 16 is a flowchart of the defect inspection process. In the defect inspection process of the present embodiment, the inspection image acquisition process in step S21 and the comparison process in step S23 are similar to those in the first embodiment. Hereinafter, the reference image generation process in step S22 will be described.

2.2.1 Reference Image Generation Process

As shown in FIG. 16, step S221 is executed similarly to the first embodiment.

[Step S240]

After step S221 is executed, the outline data generation circuit 212 of the present embodiment generates outline data based on the design data 221.

[Step S224]

Next, the opening contact area calculation circuit 213 of the present embodiment calculates the opening contact area in each outline point of the design data 221 using the radius R determined by the estimation process of the resizing amount function.

[Step S225]

Next, the estimation circuit 215 of the present embodiment calculates the resizing amount in each outline point of the design data 221 using the resizing amount function and generates a resizing map.

[Step S241]

Next, the reference image generation circuit 216 of the present embodiment executes the resizing process of the design data 221 based on the resizing map. In the present embodiment, the reference image generation circuit 216 moves the design data 221 as the resizing process.

[Step S222]

Next, the development circuit 211 of the present embodiment executes a development process of the resized (moved) design data 221.

Next, step S228 is executed. The reference image generation circuit 216 extracts the reference outline of the pattern from the developed image.

2.3 Advantages of Embodiment

The configuration of the present embodiment can attain advantages similar to those of the first embodiment.

Furthermore, with the configuration according to the present embodiment, outline data can be generated from design data.

3. THIRD EMBODIMENT

Next, a third embodiment will be described. In the third embodiment, an estimation process of a resizing amount function and a reference image generation process different from those of the first and second embodiments will be described. Hereinafter, differences from the first and second embodiments will be mainly described.

3.1 Overall Configuration of Inspection Apparatus

Figure 17:
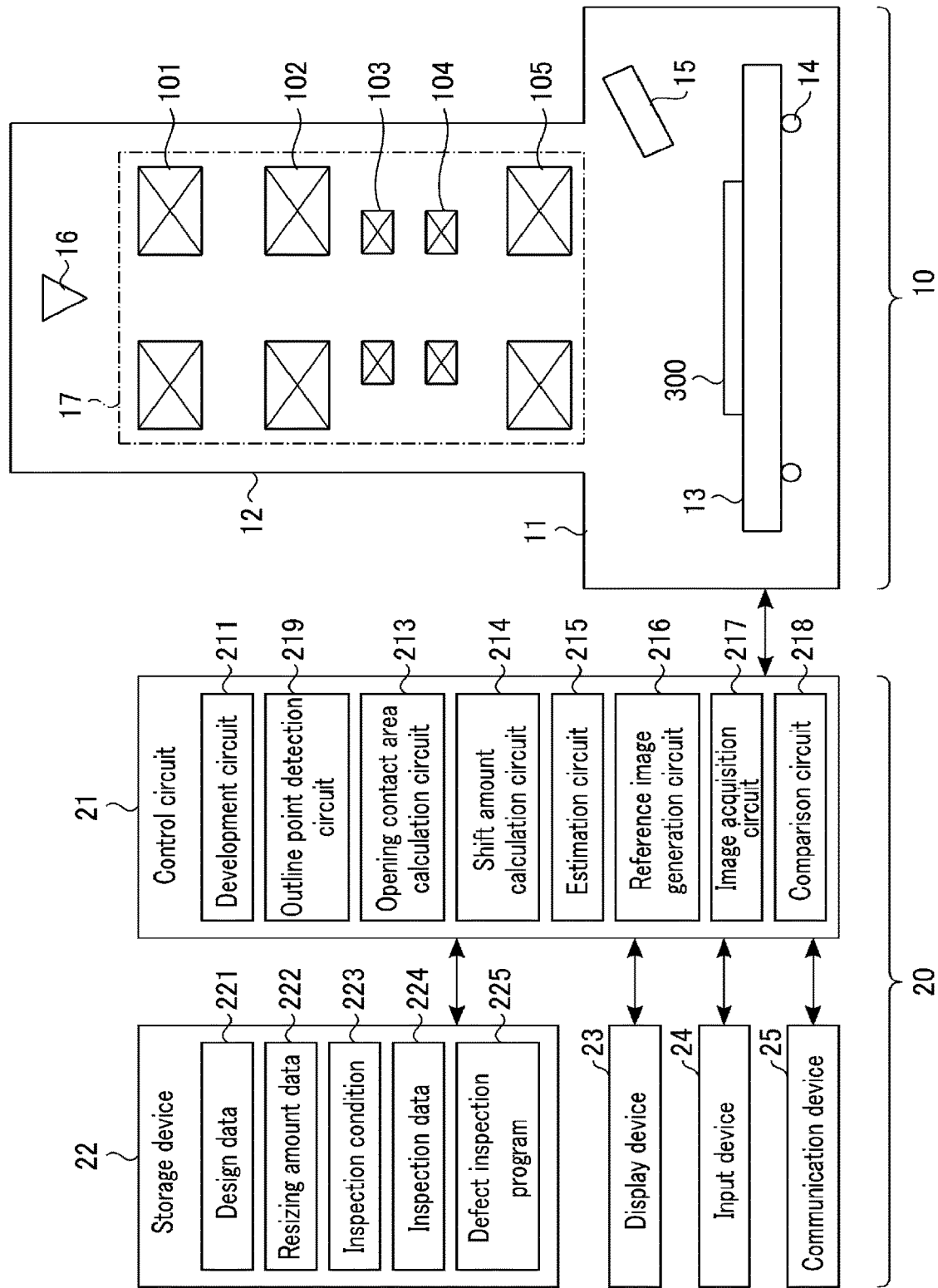
FIG. 17 is a diagram showing an overall configuration of an inspection apparatus according to a third embodiment.

First, an example of the overall configuration of the inspection apparatus will be described with reference to FIG. 17. FIG. 17 is a diagram showing an overall configuration of the inspection apparatus 1.

As shown in FIG. 1, in the inspection apparatus 1 of the present embodiment, the outline data generation circuit 212 is eliminated. An outline point detection circuit 219 is provided. Other configurations are similar to those in FIG. 1 of the first embodiment.

The outline point detection circuit 219 detects an outline point of the figure pattern of the developed image. More specifically, the detection of the outline position is to recognize coordinates through which the outline passes regardless of the format of the target data. The outline points detected by the outline point detection circuit 219 are transmitted to, for example, the opening contact area calculation circuit 213 and the shift amount calculation circuit 214, and are not stored in the storage device 22 as data.

3.2 Estimation Process of Resizing Amount Function

Figure 18:
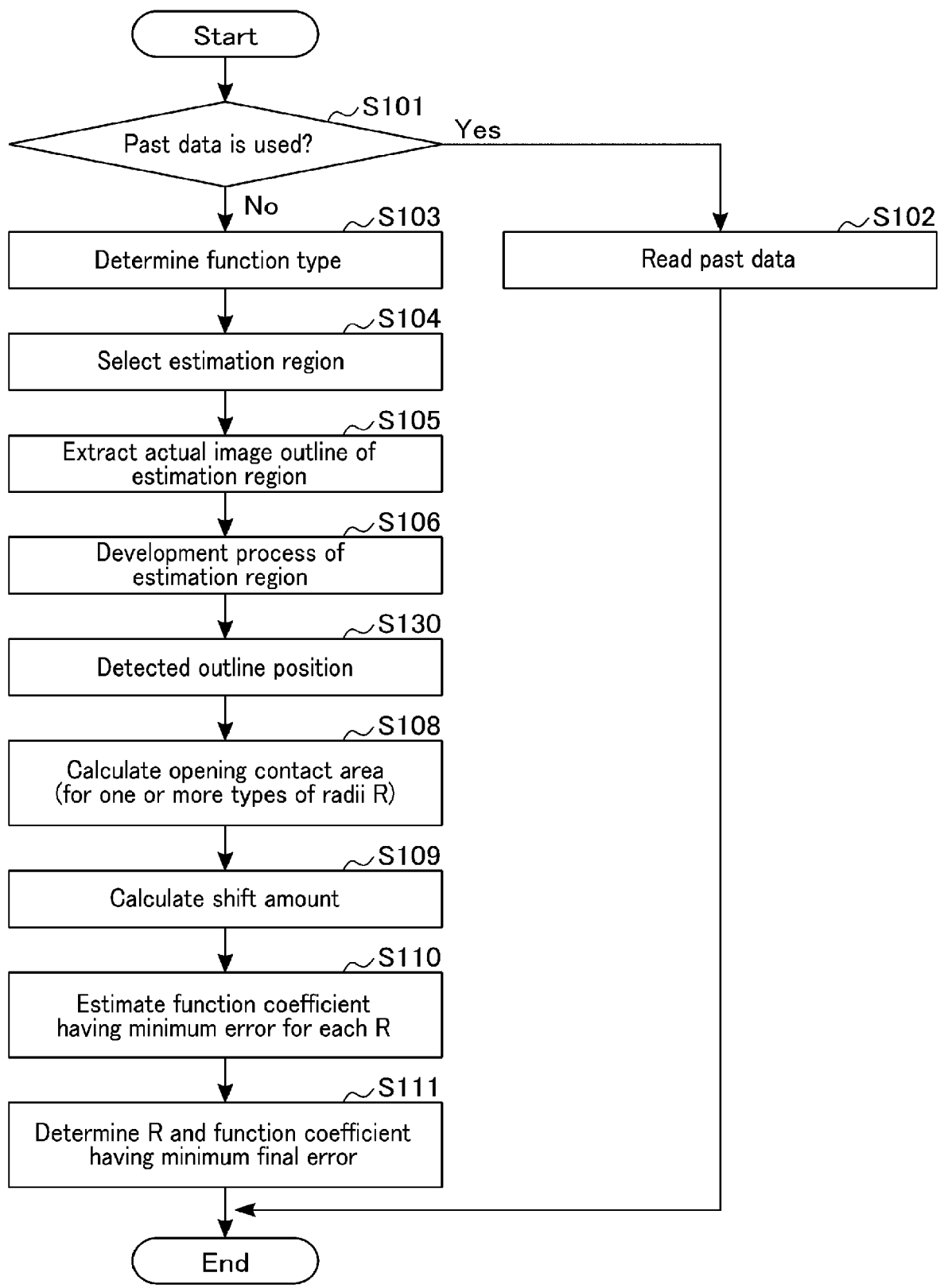
FIG. 18 is a flowchart of estimation process of a resizing amount function in the inspection apparatus according to the third embodiment.

Next, an example of the estimation process of the resizing amount function will be described with reference to FIG. 18. FIG. 18 is a flowchart of the estimation process of the resizing amount function.

As shown in FIG. 18, first, steps S101 to S106 are executed similarly to the first embodiment.

[Step S130]

After step S106 is executed, the outline point detection circuit 219 detects outline points of the pattern in the estimation region based on the developed image of the estimation region. The information of the detected outline points is not stored in the storage device 22 as data, for example.

[Step S108]

Next, the opening contact area calculation circuit 213 of the present embodiment calculates the opening contact area at each outline point. At this time, the opening contact area calculation circuit 213 may set a plurality of radii R of a circle centered on the outline point. Then, the opening contact area calculation circuit 213 calculates the opening contact area for each radius R.

[Step S109]

Next, the shift amount calculation circuit 214 of the present embodiment calculates the shift amount at each outline point in the estimation region. The shift amount calculation circuit 214 of the present embodiment calculates a distance between the detected outline point and an actual image outline as a shift amount.

Next, steps S110 to Sill are executed similarly to the first embodiment. As a result, the resizing amount function is estimated.

3.3 Defect Inspection Process

Next, an example of the defect inspection process will be described with reference to FIG. 19. FIG. 19 is a flowchart of the defect inspection process. In the defect inspection process of the present embodiment, the inspection image acquisition process in step S21 and the comparison process in step S23 are similar to those in the first embodiment. Hereinafter, the reference image generation process in step S22 will be described.

3.3.1 Reference Image Generation Process

As shown in FIG. 19, steps S221 and S222 are executed similarly to the first embodiment.

[Step S250]

After step S222 is executed, the outline point detection circuit 219 detects outline points of the developed image.

[Step S224]

Next, the opening contact area calculation circuit 213 of the present embodiment calculates the opening contact area in the detected outline points using the radius R determined by the estimation process of the resizing amount function.

[Step S225]

Next, the estimation circuit 215 of the present embodiment calculates the resizing amount in each outline point using the resizing amount function and generates a resizing map.

[Step S251]

Next, the reference image generation circuit 216 executes the resizing process of the developed image based on the resizing map. In the present embodiment, the reference image generation circuit 216 resizes the figure pattern of the developed image as the resizing process. For example, the reference image generation circuit 216 repeats the resizing process in units of one pixel. The resizing process in units of one pixel is, for example, a resizing process in which the upper limit of one resize process is set to the resizing amount 100 in a case where the resizing amount for moving the edge position by one pixel is defined as 100. For example, in a case where the pixel resizing amount is 250 in the resizing map, the resizing process is executed three times.

The resizing process of the developed image will be described with reference to FIG. 20. FIG. 20 is a diagram showing an example of the resizing process of the developed image. In FIG. 20, the pattern visualizes a pattern (figure) on the design data 221, and each pixel of the developed image has a gradation value corresponding to the figure occupancy rate. Therefore, the total of the gradation values of the developed image is proportional to the area of the figure of the region. In the example of FIG. 20, the resizing process is performed in the direction in which the figure is expanded. However, in a case where the figure is reduced, it is preferable to perform the resizing process after gradation inversion of the figure in advance and invert the figure again after the process. In the example of FIG. 20, a case where the resizing process is executed using a Sobel filter will be described. Note that the filter used to execute the resizing process is not limited to the Sobel filter.

As shown in FIG. 20, the reference image generation circuit 216 calculates the outline vector of the target pixel using the Sobel filter in the same manner as in FIG. 4. Then, the reference image generation circuit 216 forms a half-plane corresponding to the outline vector in the 3×3 developed image. Next, in the target pixel, the reference image generation circuit 216 moves the half-plane in the resizing amount direction by a resizing amount of up to one pixel or less (in this example, the resizing amount 100 or less). That is, the reference image generation circuit 216 corrects the pixel value of the target pixel according to the resizing amount, and executes the resizing process in units of one pixel. The resizing amount has two components of the X direction and the Y direction. The resizing amount in FIG. 20 is represented by a vector (Rx·cos θ, Ry·sin θ) where the resizing amount in the X direction is Rx and the resizing amount in the Y direction is Ry.

The reference image generation circuit 216 repeats the expansion process, the resizing process, and the subtraction process of the resizing amount until the resizing amount of each pixel becomes equal to or less than a preset threshold (for example, 0). The expansion process is a process of assigning a resizing amount to a pixel whose resizing amount is 0 among adjacent pixels of a pixel whose resizing amount is set to 1 or more, and increasing (expanding) the pixels to which the resizing amount is assigned. The subtraction process of the resizing amount is a process of subtracting the resizing amount for one pixel from the resizing amount after the resizing process for one pixel.

[Step S228]

Next, step S228 is executed similarly to the first embodiment. The reference image generation circuit 216 extracts the reference outline of the pattern from the developed image.

3.4 Advantages of Embodiment

The configuration of the present embodiment can attain advantages similar to those of the first embodiment.

4. MODIFICATION, ETC.

In the embodiments described above, the case where the reference image is generated in the inspection apparatus has been described, but the method of generating the reference image is not limited to the inspection apparatus. The present invention may be applied to another apparatus that generates a reference image based on data, for example, a measurement apparatus or the like.

The present invention is not limited to the above-described embodiments, and can be modified in various manners in practice when implementing the invention without departing from the gist of the invention. Moreover, the embodiments can be suitably combined; in that case, the combined advantages are obtained. Furthermore, the above-described embodiments include various inventions, and a variety of inventions can be derived by suitably combining structural elements disclosed in connection with the embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. An inspection apparatus comprising:
an imaging mechanism for imaging a sample;
an image acquisition circuit configured to extract an outline from image data of the sample imaged by the imaging mechanism;
a development circuit configured to generate a developed image from design data;
an outline data generation circuit configured to generate data of an outline point of a pattern of the developed image;
an area calculation circuit configured to calculate an area of a region not included in the pattern in a circle centered on the outline point;
an estimation circuit configured to calculate a resizing amount of the outline point based on the area; and
a reference image generation circuit configured to execute a resizing process of data of the outline point based on the resizing amount and generate a reference image based on the data of the outline point subjected to the resizing process.

2. The inspection apparatus according to claim 1, further comprising a shift amount calculation circuit configured to calculate a shift amount between the outline point and the outline.

3. The inspection apparatus according to claim 2, wherein the estimation circuit is configured to estimate a resizing amount function indicating a relationship between the area and the resizing amount from the shift amount and the area of the region at each of a plurality of the outline points, and calculate the resizing amount from the area of the outline point.

4. The inspection apparatus according to claim 1, wherein the reference image generation circuit is configured to, in the resizing process, move the outline point based on the resizing amount, and when a plurality of the outline points is included in a pixel, integrate the plurality of outline points included in the pixel.

5. The inspection apparatus according to claim 1, wherein the reference image generation circuit is configured to move the outline point based on the resizing amount in the resizing process, and when two outline points are separated by one or more pixel, interpolate a different outline point in a pixel between the two outline points.

6. An inspection apparatus comprising:
an imaging mechanism for imaging a sample;
an image acquisition circuit configured to extract an outline from image data of the sample imaged by the imaging mechanism;
an outline data generation circuit configured to generate data of an outline point of a pattern of design data;
an area calculation circuit configured to calculate an area of a region not included in the pattern in a circle centered on the outline point;
an estimation circuit configured to calculate a resizing amount of the outline point based on the area;
a development circuit configured to generate a developed image from design data subjected to resizing process; and
a reference image generation circuit configured to execute the resizing process of the design data based on the resizing amount and generate a reference image based on the developed image subjected to the resizing process.

7. The inspection apparatus according to claim 6, further comprising a shift amount calculation circuit configured to calculate a shift amount between the outline point and the outline.

8. The inspection apparatus according to claim 7, wherein the estimation circuit is configured to estimate a resizing amount function indicating a relationship between the area and the resizing amount from the shift amount and the area of the region at each of a plurality of the outline points, and calculate the resizing amount from the area of the outline point.

9. A reference image generation method comprising:
extracting an outline from image data obtained by imaging a sample;
generating a developed image from design data;
generating data of an outline point of a pattern of the developed image;
calculating an area of a region not included in the pattern in a circle centered on the outline point;
estimating a function based on the area;
calculating a resizing amount of the outline point using the function;
executing a resizing process of data of the outline point based on the resizing amount; and
generating a reference image based on the data of the outline point subjected to the resizing process.

10. The reference image generation method according to claim 9, further comprising calculating a shift amount between the outline point and the outline.

11. The reference image generation method according to claim 10, wherein the calculating the resizing amount is to estimate a resizing amount function indicating a relationship between the area and the resizing amount from the shift amount and the area of the region at each of a plurality of the outline points, and calculate the resizing amount from the area of the outline point.

12. The reference image generation method according to claim 9, wherein
the executing the resizing process including:
moving the outline point based on the resizing amount; and
when a plurality of the outline points is included in a pixel, integrating the plurality of outline points included in the pixel.

13. The reference image generation method according to claim 9, wherein
the executing the resizing process including:
moving the outline point based on the resizing amount; and
when two outline points are separated by one or more pixels, interpolating a different outline point in a pixel between the two outline points.

14. A reference image generation method comprising:
extracting an outline from image data obtained by imaging a sample;
generating data of an outline point of a pattern from design data;
calculating an area of a region not included in the pattern in a circle centered on the outline point;
estimating a function based on the area;
calculating a resizing amount of the outline point using the function;
executing a resizing process of the design data based on the resizing amount;
generating a developed image from the design data subjected to the resizing process; and
generating a reference image based on the developed image.

15. The reference image generation method according to claim 14, further comprising calculating a shift amount between the outline point and the outline.

16. The reference image generation method according to claim 15, wherein the calculating the resizing amount is to estimate a resizing amount function indicating a relationship between the area and the resizing amount from the shift amount and the area of the region at each of a plurality of the outline points, and to calculate the resizing amount from the area of the outline point.

\* \* \* \* \*